United States Patent [19]
Nakayama et al.

[11] Patent Number: 5,644,566
[45] Date of Patent: Jul. 1, 1997

[54] MAGNETO-OPTICAL RECORDING MEDIUM

[75] Inventors: Junichiro Nakayama; Michinobu Mieda, both of Shiki-gun; Hiroyuki Katayama, Sakura; Junji Hirokane; Akira Takahashi, both of Nara; Kenji Ohta, Kitakatsuragi-gun, all of Japan

[73] Assignee: Sharp Kabushiki Kaisha, Osaka, Japan

[21] Appl. No.: 432,683

[22] Filed: May 2, 1995

[30] Foreign Application Priority Data

May 24, 1994 [JP] Japan .................................. 6-109943
May 24, 1994 [JP] Japan .................................. 6-109948

[51] Int. Cl.$^6$ .................................................. G11B 7/00
[52] U.S. Cl. ..................... 369/275.2; 369/100; 369/13
[58] Field of Search ........................... 369/275.2, 225.3, 369/275.4, 100, 116, 110, 13, 59

[56] References Cited

U.S. PATENT DOCUMENTS 5,278,810  1/1994  Takahashi et al. ..................... 369/13

FOREIGN PATENT DOCUMENTS

A-0513668  11/1992  European Pat. Off. .
A-0525705  2/1993  European Pat. Off. .
5-22303  3/1993  Japan .

*Primary Examiner*—Muhammad N. Edun
*Attorney, Agent, or Firm*—David G. Conlin; Brian L. Michaelis

[57] ABSTRACT

An intermediate layer is formed between a memory layer and a writing layer. The intermediate layer shows in-plane magnetization at room temperature, and perpendicular magnetization within a temperature range within which the coercive force of the memory layer is lower than that of the writing layer. The Curie point of the intermediate layer is lower than that of the memory layer. Like a conventional method, light-intensity modulation overwriting is performed by irradiating laser light whose intensity has been modulated between high level and low level while applying a recording magnetic field after performing an initialization. Even when there are variations in the raised temperature by the irradiation of laser light of high level, it is possible to perform stable overwriting with light-intensity modulation by satisfactorily restraining the exchange forces between the intermediate layer and the writing layer from causing coupling.

5 Claims, 9 Drawing Sheets

FIG.12
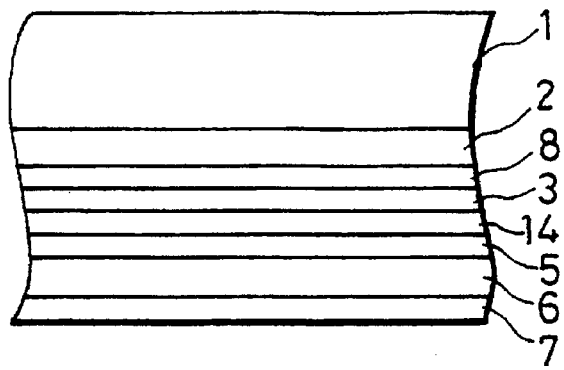
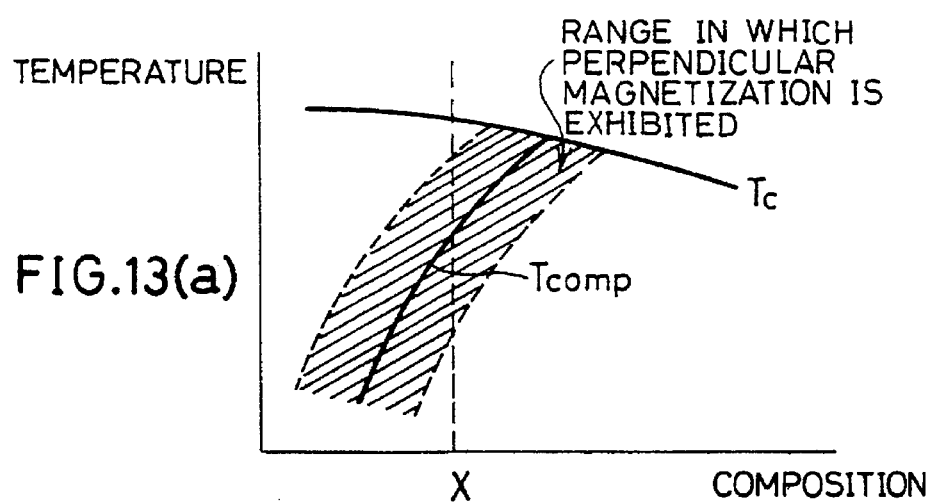
FIG.13(a)
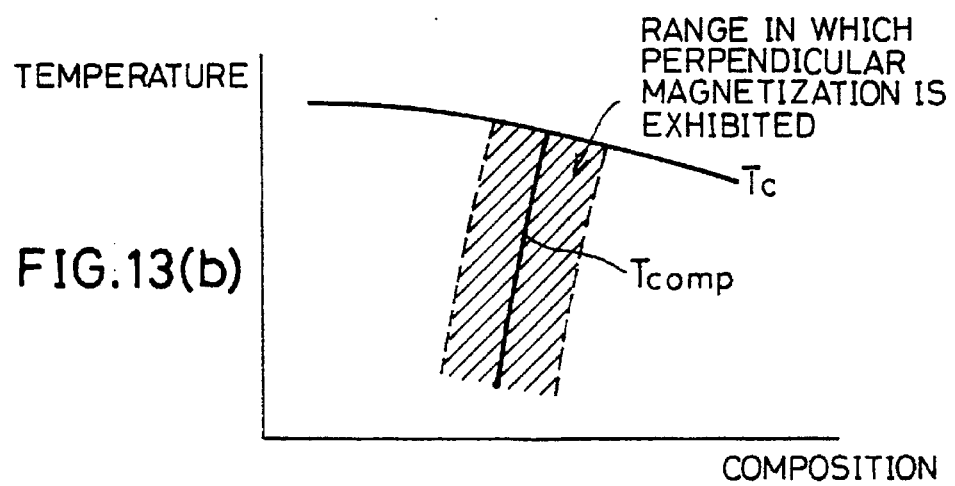
FIG.13(b)

1

MAGNETO-OPTICAL RECORDING MEDIUM

FIELD OF THE INVENTION

The present invention relates to a magneto-optical recording media, for example, magneto-optical disk, magneto-optical tapes and magneto-optical cards.

BACKGROUND OF THE INVENTION

A magneto-optical disk has a memory layer for information. The memory layer is formed on a substrate by a perpendicularly magnetized film of a magnetic substance. Recording and reproduction of information on such a magneto-optical disk are carried out as follows. When recording, first, initialization is performed by orienting the magnetization direction of the memory layer in one direction (upward or downward direction) with a strong external magnetic field. Then, laser light is irradiated on an area in which information is to be recorded so as to heat the area to have a temperature not lower than the vicinity of the Curie point of the memory layer or the vicinity of the compensation point thereof. In this arrangement, the coercive force in the area is made zero or substantially zero, and then an external magnetic field (bias magnetic filed) whose direction is opposite to that of the magnetic field used for the initialization is applied to reverse the magnetization direction. When the irradiation of laser light is stopped, the temperature of the memory layer returns to room temperature, and therefore the reversed magnetization is fixed. As a result, information is thermomagnetically recorded.

In reproduction, the disk is irradiated with linearly polarized laser light, and information is optically readout by using phenomena (Kerr magnetic effect and Faraday magnetic effect) in which the plane of polarization of reflected light or transmitted light from the disk is rotated according to the magnetization direction of the memory layer.

On the other hand, magneto-optical disks on which information was recorded by the above-mentioned magneto-optical recording method have been focused as rewritable large-capacity memory elements. In order to achieve a magneto-optical disk which permits rewriting of information by performing initialization with a relatively weak initializing magnetic field and modulating the intensity of light while applying a recording magnetic field, i.e., a so-called overwritable magneto-optical disk by light-intensity modulation, it has been conventionally proposed to form a memory layer by exchange-coupled two-layer films.

Furthermore, as illustrated in FIG. 14, a magneto-optical disk disclosed in Japanese Publication for Examined Patent Application (Tokukohei) No. 5-22303 includes three magnetic layers, first to third magnetic layers 21 to 23, so as to reduce the initializing magnetic field and improve the stability of recording bits. The first magnetic layer 21 as a memory layer and the third magnetic layer 23 as a writing layer show perpendicular magnetization within temperature ranges between room temperature and their Curie points. On the other hand, the second magnetic layer 22 as an intermediate layer formed between the layers 21 and 23 exhibits in-plane magnetization at room temperature and perpendicular magnetization as the temperature is increased. As illustrated in FIG. 15, the third magnetic layer 23 is formed so that a coercive force $H_L$ thereof at room temperature is smaller than a coercive force $H_H$ of the first magnetic layer 21 and a Curie point $T_H$ thereof is higher than a Curie point $T_L$ of the first magnetic layer 21. Although not shown in the drawings, the second magnetic layer 22 is formed so that a Curie point $T_M$ thereof is located between the Curie points $T_L$ of the first magnetic layer 21 and the Curie point $T_H$ of the third magnetic layer 23.

The procedure for overwriting a magneto-optical disk having the above-mentioned structure is briefly explained below. An initializing magnetic field Hinit whose strength at room temperature is between the coercive forces $H_H$ and $H_L$ of the first and third magnetic layers 21 and 23 is applied as illustrated in FIG. 14. At this time, the magnetization direction of the first magnetic layer 21 remains unchanged, while the magnetization direction of the third magnetic layer 23 is aligned in one direction along the direction of the initializing magnetic field Hinit. In FIG. 14, the arrows shown in the magnetic layers 21 to 23 indicate the magnetization direction of the sub-lattice of the transition metal of each of the layers 21 to 23.

At this time, since the second magnetic layer 22 exhibits in-plane magnetization at room temperature, magnetic coupling forces (exchange forces) between the first magnetic layer 21 and the third magnetic layer 23 are prevented. As a result, the strength of the initializing magnetic field Hinit is further decreased. It is thus possible to align the magnetization direction of the third magnetic layer 23 in one direction.

Next, laser light whose intensity is modulated between high level I and low level II depending on information to be recorded is irradiated while applying a recording magnetic field $H_W$ whose strength is smaller than that of the initializing magnetic field Hinit and whose direction is opposite to that of the initializing magnetic field Hinit.

When laser light of high level I is irradiated, the temperature of the irradiated area exceeds the Curie points $T_L$ and $T_M$ of the first and second magnetic layers 21 and 22 and is raised to near the Curie point $T_H$ of the third magnetic layer 23. As a result, the magnetization direction of the third magnetic layer 23 is reversed along the direction of the recording magnetic field $H_W$. Consequently, the magnetization direction of the third magnetic layer 23 is copied to the second magnetic layer 22 showing perpendicular magnetization due to exchange forces acting on the boundary thereof, and then copied to the first magnetic layer 21.

On the other hand, when laser light of low level II is irradiated, the temperature of the irradiated area is heated only to a temperature near the Curie point $T_L$ of the first magnetic layer 21. At this time, since the coercive force of the third magnetic layer 23 is larger than the recording magnetic field $H_W$, the magnetization direction is not reversed, thereby maintaining the magnetization direction produced by the initialization. Similarly, the magnetization direction of the third magnetic layer 23 is copied to the first magnetic layer 21 through the second magnetic layer 22 by the exchange forces acting on the boundary thereof with a decrease of the temperature to room temperature.

In the above-mentioned procedure, new information corresponding to the intensity-modulated laser light is recorded on the first magnetic layer 21. Reproduction of the recorded information is carried out by irradiating laser light of an intensity lower than low level II.

However, the above-mentioned magneto-optical disk is configured so that the Curie point $T_M$ of the second magnetic layer 22 showing a transition from in-plane magnetization to perpendicular magnetization with an increase of the temperature and that the Curie points $T_H$ and $T_L$ of the first and third magnetic layers 21 and 23 to establish the relation $T_L < T_M < T_H$. Therefore, if $T_M$ is close to $T_H$, overwriting with light-intensity modulation cannot be performed smoothly.

Namely, in order to improve the characteristics of reproduced signals by increasing the Kerr rotation angle when irradiating linearly polarized laser light in reproduction, it is effective to use a material having a high Curie point $T_L$ for the first magnetic layer 21. In this case, if the second magnetic layer 22 is formed so as to satisfy the above-mentioned relation, the Curie point $T_M$ thereof becomes closer to the Curie point $T_H$ of the third magnetic layer 23. Actually, the magneto-optical disk disclosed in the above-mentioned publication has a structure in which, for example, when the Curie point $T_H$ of the third magnetic layer 23 is 180° C., the Curie point $T_M$ of the second magnetic layer 22 is 170° C. (see Japanese Publication for Examined Patent Application (Tokukohei) No. 5-22303, column 9, line 42 to column 10, line 12).

As described above, in the structure where $T_H$ and $T_M$ are close to each other, when laser light of high level I is irradiated to raise the temperature to near $T_H$, it is necessary to reverse the magnetization direction of the third magnetic layer 23 along the direction of the recording magnetic field $H_W$ at a temperature not higher than the Curie point $T_M$ of the second magnetic layer 22 due to, for example, variations in the raised temperature caused by changes in ambient temperature. At this time, since the second magnetic layer 22 exhibits perpendicular magnetization, exchange forces from the second magnetic layer 22 act on the third magnetic layer 23. Therefore, with the recording magnetic field which is determined by only considering the coercive force of the third magnetic layer 23, the magnetization direction of the third magnetic layer 23 may not be satisfactorily reversed. Consequently, as mentioned above, overwriting with light-intensity modulation cannot be smoothly performed.

SUMMARY OF THE INVENTION

It is an object of the present invention to provide a magneto-optical recording medium capable of smoothly performing overwriting by light-intensity modulation and of improving the characteristics of reproduced signals.

It is another object of the present invention to provide a magneto-optical recording medium with easy manufacturing processes.

In order to achieve the above objects, a magneto-optical recording medium of the present invention includes:

- a memory layer showing perpendicular magnetization within a temperature range between room temperature and a Curie point thereof;
- a writing layer showing perpendicular magnetization within a temperature range between room temperature and a Curie point thereof which is higher than the Curie point of the memory layer, the writing layer having a coercive force smaller than a coercive force of the memory layer at room temperature; and
- an intermediate layer between the memory layer and the writing layer, the intermediate layer showing in-plane magnetization at room temperature and perpendicular magnetization within a temperature range within which the coercive force of the memory layer is smaller than the coercive force of the writing layer, the intermediate layer having a Curie point lower than the Curie point of the memory layer.

With the magneto-optical recording medium having this structure, it is possible to perform overwriting with light-intensity modulation through a procedure similar to a conventional procedure. Specifically, first, an initializing magnetic field whose strength is between the coercive forces of the memory layer and the writing layer is applied at room temperature to align only the magnetization direction of the writing layer with the direction of the initializing magnetic field. At this time, since an intermediate layer showing in-plane magnetization at room temperature is formed between the memory layer and the writing layer, a coupling by exchange forces between the memory layer and the writing layer is prevented. It is thus possible to carry out the initialization with a smaller initializing magnetic field.

Next, laser light whose intensity has been modulated is irradiated while applying a recording magnetic field. When the temperature of an irradiated area exceeds the Curie point of the memory layer and is increased to near the Curie point of the writing layer by the irradiation of laser light of high level, the magnetization direction of the writing layer is reversed along the direction of the recording magnetic field. Since the intermediate layer exhibits perpendicular magnetization within a temperature range within which the coercive force of the memory layer is smaller than the coercive force of the writing layer in the process of lowering the temperature of the irradiated area to room temperature, the magnetization direction of the writing layer is copied through the intermediate layer to the memory layer by exchange forces acting on the boundary thereof within this temperature range.

On the other hand, when laser light of low level is irradiated and the temperature of the irradiated area is increased to near the Curie point of the memory layer, the magnetization direction of the writing layer is kept in the direction oriented by the initialization, and the coercive force of the memory layer is lowered. At this time, the magnetization direction of the writing layer is copied through the intermediate layer to the memory layer like the above-mentioned case in the process of lowering the temperature. Thus, new information is written on the memory layer according to laser light whose intensity has been modulated.

Since the Curie point of the intermediate layer is lower than the Curie point of the memory layer, even when there are variations in the raised temperature at the time the laser light of high level is irradiated, a coupling can never be caused by the exchange forces between the intermediate layer and the writing layer. Consequently, overwriting with light-intensity modulation is performed in a stable manner.

Moreover, unlike a conventional structure, there is no need to set the Curie point of the intermediate layer between those of the memory layer and the writing layer. It is therefore possible to increase the Curie point of the memory layer to be higher than the Curie point in the conventional structure. As a result, a Kerr rotation angle is increased during the irradiation of laser light for reproduction, thereby improving the characteristics of reproduced signals.

A second magneto-optical recording medium of the present invention includes:

- a memory layer showing perpendicular magnetization within a temperature range between room temperature and a Curie point thereof;
- a writing layer showing perpendicular magnetization within a temperature range between room temperature and a Curie point thereof which is higher than the Curie point of the memory layer, the writing layer having a coercive force smaller than a coercive force of the memory layer at room temperature; and
- an intermediate layer between the memory layer and the writing layer, the intermediate layer showing perpendicular magnetization within a temperature range within which the coercive force of the memory layer is smaller than the coercive force of the writing layer and in-plane magnetization at temperatures lower than and higher than the temperature range.

With the structure of the second magneto-optical recording medium, it is possible to perform overwriting with light-intensity modulation by a procedure similar to the conventional procedure. Namely, first, an initializing magnetic field whose strength is between the coercive forces of the memory layer and the writing layer is applied at room temperature so as to align only the magnetization direction of the writing layer with the direction of the initializing magnetic field. At this time, since an intermediate layer showing in-plane magnetization at room temperature is formed between the memory layer and the writing layer, it is possible to prevent a coupling from being caused by exchange forces between the memory layer and the writing layer. Consequently, initialization is performed with a smaller initializing magnetic field.

Next, laser light whose intensity has been modulated is irradiated while applying a recording magnetic field. When the temperature of the area irradiated by laser light of high level exceeds the Curie point of the memory layer and is increased to near the Curie point of the writing layer, the magnetization direction of the writing layer is reversed along the direction of the recording magnetic field. Then, the raised temperature lowers to room temperature. In the process of lowering the raised temperature to room temperature, the intermediate layer exhibits perpendicular magnetization within a temperature range in the vicinity of the Curie point of the memory layer, within which the coercive force of the memory layer is smaller than the coercive force of the writing layer. Therefore, the magnetization direction of the writing layer is copied through the intermediate layer to the memory layer by exchange forces acting on the boundary thereof within this temperature range.

On the other hand, when laser light of low level is irradiated and the temperature of the irradiated area is increased to near the Curie point of the memory layer, the magnetization of the writing layer is kept in the direction oriented by the initialization, and the coercive force of the memory layer is decreased. At this time, like the above-mentioned case, the magnetization direction of the writing layer is copied through the intermediate layer to the memory layer in the process of lowering the temperature. Thus, new information is written on the memory layer according to laser light whose intensity has been modulated.

In this case, since the intermediate layer exhibits in-plane magnetization when the temperature thereof exceeds the above-mentioned temperature range, i.e., the temperature range in the vicinity of the Curie point of the memory layer, it is possible to prevent the exchange forces between the intermediate layer and the writing layer from causing a coupling during the irradiation of laser light of high level like the conventional structure. Therefore, by applying a recording field corresponding to the coercive force of the writing layer, the magnetization direction is stably reversed. Moreover, unlike the conventional structure, there is no need to set the Curie point of the intermediate layer between those of the memory layer and the writing layer. Namely, it is possible to increase the Curie point of the intermediate layer to be higher than the Curie point of the writing layer.

Consequently, even when there are variations in the raised temperature at the time the laser light of high level is irradiated, a coupling can never be caused by the exchange forces between the intermediate layer and the writing layer. It is thus possible to perform overwriting with light-intensity modulation in a stable manner.

Furthermore, since there is no need to set the Curie point of the intermediate layer between those of the memory layer and the writing layer, it is possible to increase the Curie point of the memory layer to be higher than the Curie point in the conventional structure. As a result, a Kerr rotation angle is increased during the irradiation of laser light for reproduction, thereby improving the characteristics of reproduced signals.

A third magneto-optical recording medium of the present invention is based on the second magneto-optical recording medium and is characterized by the intermediate layer formed by a film of a GdFeCo series rare-earth and transition metal alloy.

In the structure of the third magneto-optical recording medium, the intermediate layer, which shows in-plane magnetization at room temperature, temporarily shows perpendicular magnetization as the temperature is increased and again shows in-plane magnetization, is formed by a GdFeCo series rare-earth and transition metal alloy. As illustrated in FIG. 13(a), this material is formed so that a curve representing a compensation temperature Tcomp which changes relating to the variations of the composition is moderate and that the temperature ranges on both sides of the curve of the compensation temperature Tcomp within which perpendicular magnetization is exhibited varies moderately depending on the variations of the composition. Thus, if a composition X is determined and when the intermediate layer is actually produced according to the composition X, the tolerance for the variations of the composition becomes wider. This eases the manufacture of the intermediate layer having the above-mentioned magnetic properties, i.e., the intermediate layer showing in-plane magnetization at room temperature, temporarily showing perpendicular magnetization as the temperature is increased and then in-plane magnetization again.

For a fuller understanding of the nature and advantages of the invention, reference should be made to the ensuing detailed description taken in conjunction with the accompanying drawings.

BRIEF DESCRIPTION OF THE DRAWINGS

FIG. 12 is a depiction of a profile showing a schematic structure of a magneto-optical recording medium according to a yet another embodiment of the present invention.

FIGS. 13(a) and 13(b) show the compositions of alloys of rare-earth metal and transition metal, and variations in the state of magnetization thereof with respect to changes in the temperature, 13(a) being a view showing the state of magnetization of an alloy of rare-earth metal and transition metal of GdFeCo series, 13(b) being a view showing the state of magnetization of an alloy of rare-earth metal and transition metal of GdTbFe series.

DESCRIPTION OF PREFERRED EMBODIMENTS

[Embodiment 1]

The following description discusses a detailed embodiment of the present invention with reference to FIGS. 1 to 5.

Figure 2:
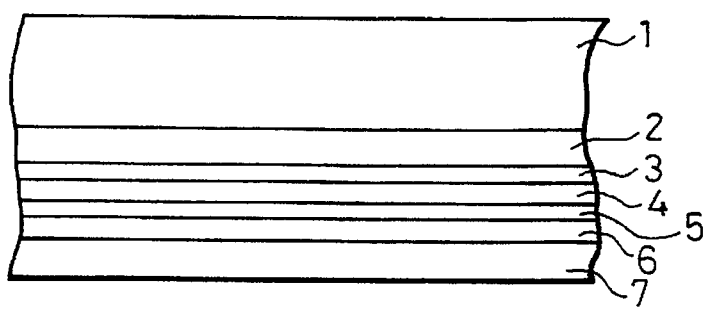
FIG. 2 is a depiction of a profile showing a schematic structure of the magneto-optical recording medium.

As illustrated in FIG. 2, a magneto-optical disk as a magneto-optical recording medium of this embodiment includes a transparent substrate 1, a dielectric layer 2, a first magnetic layer 3 as a recoding layer, a second magnetic layer 4 as an intermediate layer, a third magnetic layer 5 as a writing layer, a protective layer 6, and an overcoat layer 7. The transparent dielectric layer 2, the first magnetic layer 3, the second magnetic layer 4, the third magnetic layer 5, the protective layer 6, and the overcoat layer 7 are successively layered on the substrate 1.

For example, the substrate 1 is formed by a disk-shaped glass plate with an outer diameter of 86 mm, an inner diameter of 15 mm and a thickness of 1.2 mm. On one of the surfaces of the substrate 1 (lower surface in FIG. 2), guide tracks (not shown) in the form of grooves and lands are formed by reactive ion etching. The guide tracks are used for guiding a light beam. The track pitch, the width of a groove and the width of a land are set 1.6 μm, 0.8 μm and 0.8 μm, respectively. The light transmitting transparent dielectric layer 2 is formed by AlN with a film thickness of 80 nm is formed on the surface of the guide tracks on the substrate 1 by reactive ion sputtering.

Figure 1:
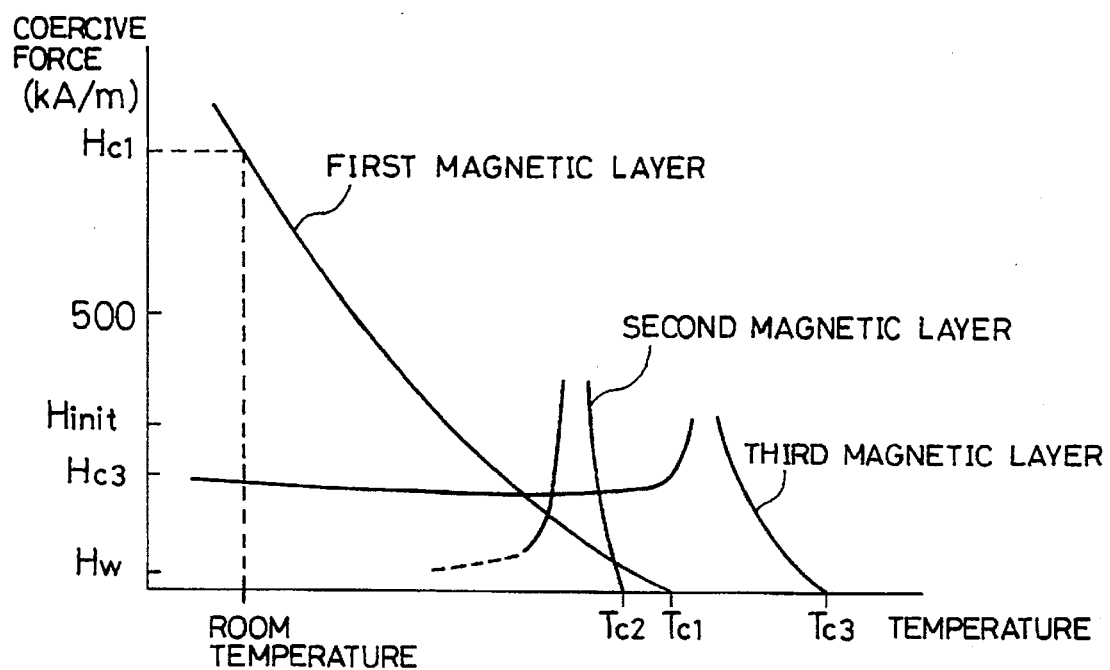
FIG. 1 is a graph showing the temperature dependence of coercive force of each of the first to third magnetic layer in a magneto-optical recording medium according to one embodiment of the present invention.

The first magnetic layer 3 on the transparent dielectric layer 2 is formed by an alloy of rare-earth and transition metal, DyFeCo, to have a film thickness of 50 nm by simultaneously sputtering Dy, Fe and Co targets. The first magnetic layer 3 has a transition metal rich composition, $Dy_{0.21}(Fe_{0.81}Co_{0.19})_{0.79}$. As illustrated in FIG. 1, the first magnetic layer 3 has a lower Curie point $Tc_1 (=180°$ C.) than the Curie point of the third magnetic layer 5, to be described later, and a high coercive force (=1200 kA/m) at room temperature. The first magnetic layer 3 exhibits perpendicular magnetization within a temperature range between room temperature and $Tc_1$.

The second magnetic layer 4 on the first magnetic layer 3 is also formed by an alloy of rare-earth and transition metal, DyFeCo, to have a film thickness of 50 nm by simultaneously sputtering Dy, Fe and Co targets. The second magnetic layer 4 has a rare-earth metal rich composition, $Dy_{0.29}(Fe_{0.80}Co_{0.20})_{0.71}$. The Curie point $Tc_2$ of the second magnetic layer 4 is 140° C. which is lower than the Curie point $Tc_1$ of the first magnetic layer 3. A coercive force $Hc_2$ of the second magnetic layer 4 is substantially zero at room temperature (the coercive force means a coercive force in a direction perpendicular to the substrate 1). The second magnetic layer 4 shows in-plane magnetization at room temperature, and perpendicular magnetization as the temperature is increased to around 100° C. In FIG. 1, a range within which in-plane magnetization is exhibited is indicated by the broken line. A range within which perpendicular magnetization is exhibited is a temperature range within which the coercive force of the first magnetic layer 1 is smaller than that of the third magnetic layer 5 as shown by the solid lines.

The third magnetic layer 5 on the second magnetic layer 4 is formed by an alloy of rare-earth and transition metal, GdDyFeCo, to have a film thickness of 50 nm by simultaneously sputtering Gd, Dy, Fe and Co targets. The third magnetic layer 5 has a rare-earth metal rich composition, $(Gd_{0.40}Dy_{0.60})_{0.27}(Fe_{0.70}Co_{0.30})_{0.73}$. The Curie point $Tc_3$ of the third magnetic layer 5 is 250° C. that is higher than the Curie point $Tc_1$ of the first magnetic layer 5. The compensation temperature $T_{comp3}$ of the third magnetic layer 5 is 200° C., and the coercive force $Hc_3$ thereof at room temperature is 64 kA/m which is smaller than the coercive force $H_{c1}$ of the first magnetic layer 3. The third magnetic layer 5 shows perpendicular magnetization within a temperature range between room temperature and $Tc_3$.

The protective layer 6 is formed on the third magnetic layer 5 by AlN to have a film thickness of 80 nm. The protective layer 6 is coated with an acrylate series ultraviolet-rays hardening resin. The overcoat layer 7 is formed by hardening the acrylate series ultraviolet-rays hardening resin with the application of ultraviolet rays. As a result, a magneto-optical disk having a profile shown in FIG. 2 is produced.

Sputtering conditions for the formation of the first to third magnetic layers 3 to 5 are as follows. The degree of ultimate vacuum is not higher than $2.0 \times 10^{-4}$ Pa, the pressure of Ar gas is $6.5 \times 10^{-1}$ Pa, and discharge electric power is 300 W. Sputtering conditions for the formation of the transparent dielectric layer 2 and the protective layer 6 are set such that the degree of ultimate vacuum is not higher than $2.0 \times 10^{-4}$ Pa, the pressure of $N_2$ gas is $3.0 \times 10^{-1}$ Pa, and discharge electric power is 800 W.

Figure 3:
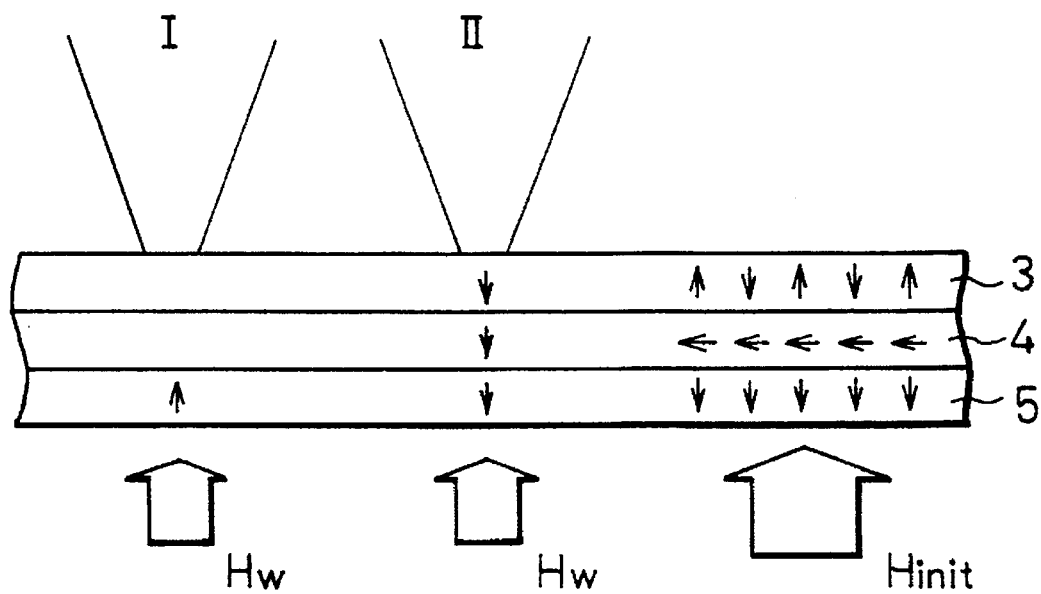
FIG. 3 is an explanatory view showing a recording process with respect to the magneto-optical recording medium.
Figure 4:
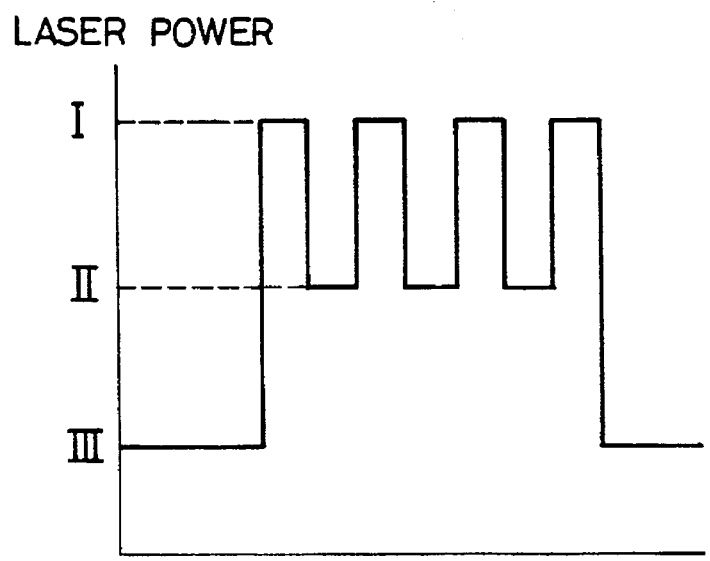
FIG. 4 is an explanatory view showing the intensity of laser light to be irradiated on the magneto-optical recording medium.

When recording information on the above-mentioned magneto-optical disk, as illustrated in FIG. 3, first, for example, an upward initializing magnetic field Hinit is applied to carry out initialization. Then, as shown in FIG. 4, laser light whose intensity is modulated between high level I and low level II is irradiated while applying a recording magnetic field $H_W$ whose direction is equal to that of the initializing magnetic field Hinit and whose strength is sufficiently smaller than Hinit. Consequently, information is recorded.

Figure 5:
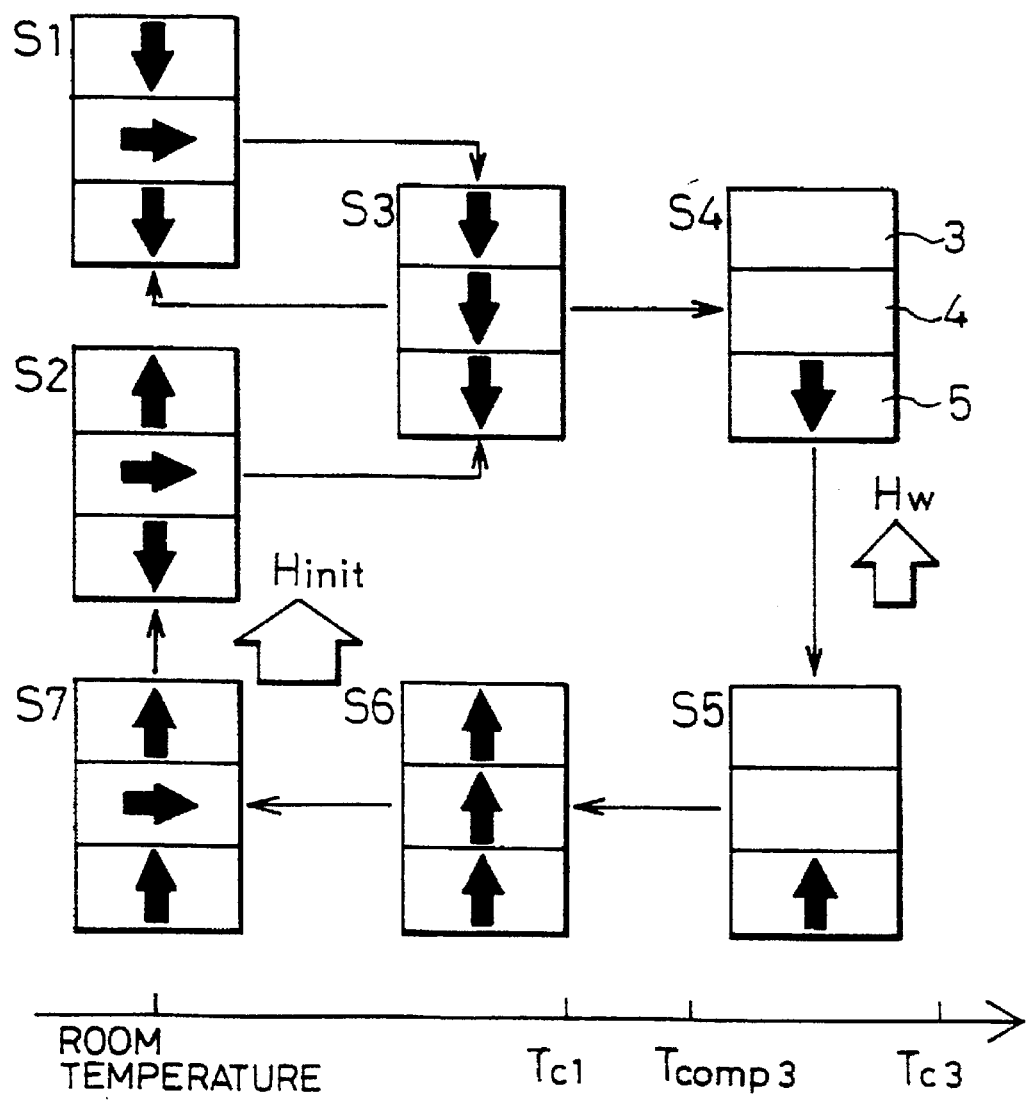
FIG. 5 is an explanatory view showing changes in the magnetization of the magneto-optical recording medium during recording.

Variations in the state of magnetization of the magnetic layers 3 to 5 during recording of information are explained below with reference to FIG. 5. In FIG. 5, the horizontal axis indicates temperatures. The temperatures show variations in the state of magnetization of the magnetic layers 3 to 5 when the initializing magnetic field Hinit is applied at room temperature and when the temperature is raised by the irradiation of laser light of high level I and low level II while applying the recording magnetic field $H_W$. All of the magnetic layers 3 to 5 are formed by rare-earth and transition metal alloys. In this case, it is possible to show the direction of magnetization of each of the magnetic layers 3 to 5 by the total magnetization, the magnetization of the sub-lattice of the rare-earth metal or the magnetization of the sub-lattice of transition metal. In FIG. 5, the arrows shown in the magnetic layers 3 to 5 respectively indicate the direction of magnetization of the sub-lattice of the transition metal.

When the initializing magnetic field Hinit is applied at room temperature, the direction of magnetization of each of the magnetic layers 3 to 5 becomes either of the two stable states S1 and S2 shown in FIG. 5. In this case, the initializing magnetic field Hinit is set to take a value, for example, 80 kA/m between the coercive force $Hc_1$(=1200 kA/m) of the first magnetic layer 3 and $Hc_3$ ($_{\approx}$64 kA/m) of the third magnetic layer 5 at room temperature. Therefore, only the magnetization of the third magnetic layer 5 is aligned in one direction along the initializing magnetic filed Hinit by the initialization. For instance, when the initializing magnetic field is applied in an upward direction and when the total magnetization of the third magnetic layer 5 is aligned with the orientation of the initializing magnetic filed Hinit, since the third magnetic layer 5 is rare-earth metal rich, the direction of magnetization of the sub-lattice of the transition metal is oriented in a downward direction that is opposite to the orientation of the initializing magnetic field Hinit.

At this time, the coercive force $Hc_1$ of the first magnetic layer 3 is sufficiently larger than Hinit, and the second magnetic layer 4 exhibits in-plane magnetization at room temperature. Therefore, the magnetization direction of the third magnetic layer 5 is not copied to the first magnetic layer 3 through the second magnetic layer 4, and thus the magnetization direction of the first magnetic layer 3 is not reversed. As a result, the first magnetic layer 3 keeps the magnetization in the direction corresponding to the recorded state. Namely, the first magnetic layer 3 is in either the states of S1 or S2.

In the structure where the initializing magnetic field Hinit is applied by a permanent magnet installed in a recording and reproducing device, initialization is always performed during rotations of the magneto-optical disk. Whereas in a device in which the initializing magnetic field Hinit is applied by an electromagnet, initialization is only performed during recording.

After performing the initialization, laser light whose intensity is modulated between high level I and low level II according to information to be recorded is irradiated while applying the recording magnetic field $H_W$ (for example, 16 kA/m) in the manner as described above.

The laser power of the laser light of high level I is set so that the temperature of the irradiated area exceeds the Curie points $Tc_1$ and $Tc_2$ of the first and second magnetic layers 3 and 4 and is increased to near or above the Curie point $Tc_3$(=250° C.) of the third magnetic layer 5. On the other hand, the laser power of the laser light of low level II is set so that the temperature of the irradiated area exceeds the Curie point $Tc_2$ of the second magnetic layer 4 and is increased to near the Curie point $Tc_1$ (=180° C.) of the first magnetic layers 3.

Thus, first, laser light of high level I is irradiated. In the process of raising the temperature of the irradiated area in the above-mentioned manner, the states S1 and S2 change to S5 through S3 and S4. More specifically, in S3, since the second magnetic layer 4 temporarily exhibits perpendicular magnetization in the process of raising the temperature, magnetic coupling forces (exchange forces) from the third magnetic layer 5 acts on the first magnetic layer 3 through the second magnetic layer 4. As a result, the magnetization direction of the first magnetic layer 3 is aligned with that of the third magnetic layer 5. When the temperatures of the first and second magnetic layers 3 and 4 are raised to exceed the Curie points $Tc_1$ and $Tc_2$ through the state S3, respectively, the magnetization of each of the layers 3 and 4 becomes zero as shown in S4 and S5.

On the other hand, in the state S3 in the course of raising the temperature, the magnetization of the third magnetic field 5 is maintained in the direction in which the magnetization is forcefully oriented by the initialization. When the third magnetic layer 5 is heated to a temperature near the Curie point $Tc_3$, the coercive force thereof decreases. Consequently, as shown by a change from S4 to S5, the magnetization direction of the third magnetic layer 5 is reversed along the direction of the recording magnetic field $H_W$ being applied.

When the third magnetic layer 5 is heated as mentioned above, the temperature thereof exceeds its compensation temperature $Tcomp_3$ (=200° C.) at the time the state changes from S3 to S4. At this time, the relation between the strength of magnetization of the sub-lattice of the rare-earth metal and that of the transition metal of the third magnetic layer 5 is reversed. Therefore, unlike the state at room temperature, in the states S4 and S5, the magnetization direction of the sub-lattice of the transition metal of the third magnetic layer 5 is equal to the direction of the total magnetization. Thus, as illustrated in S4 and S5 of FIG. 4, the magnetization direction of the sub-lattice of the transition metal of the third magnetic layer 5 is reversed by the recording magnetic field $H_W$ whose direction is equal to the direction of the initializing magnetic field Hinit.

When the magnetization direction is reversed in such a manner, since the temperatures of the first and second magnetic layers 3 and 4 exceed their Curie temperatures, respectively, the exchange forces from the magnetic layers 3 and 4 do not act on the third magnetic layer 5, thereby reducing the recording magnetic field $H_W$ for reversing the magnetization direction of the third magnetic layer 5.

As described above, after the magnetization direction of the third magnetic layer 5 is reversed along the direction of the recording magnetic field $H_W$, when the laser light irradiates another area due to the rotation of the magneto-optical disk, the temperature of the previously irradiated area decreases to room temperature. In the process of cooling, the second magnetic layer 4 shows perpendicular magnetization. At this time, the magnetization direction is aligned with the magnetization direction of the third magnetic layer 5 as shown in the state S6 by the exchange forces acting on the boundary of the second and third magnetic layers 4 and 5. Moreover, the magnetization direction of the first magnetic layer 3 is aligned with the magnetization direction of the second magnetic layer 4 by the exchange forces acting on the boundary of the first and second magnetic layers 3 and 4.

Then, when the temperature of the irradiated area decreases to room temperature, the second magnetic layer 4 exhibits in-plane magnetization as shown in the state S7. Consequently, the exchange forces do not act on the boundary of the first and third magnetic layers 3 and 5.

In this state, even if the magneto-optical disk is rotated and the initializing magnetic field Hinit is applied at room temperature, the magnetization direction of the first magnetic layer 3 having a large coercive force does not change, and only the magnetization direction of the third magnetic layer 5 having a small coercive force is reversed in the manner mentioned above. Then, the state is changed from S7 to S2. Thus, the magnetization direction of the first magnetic layer 3 becomes opposite to the direction of the initializing magnetic field. Consequently, new information corresponding to the laser light modulated to high level I is written on the first magnetic layer 3.

The following description explains changes in the state of magnetization of each of the magnetic layers 3 to 5 when laser light of low level II is irradiated while applying the recording magnetic field $H_W$ after the initialization.

At this time, the area irradiated by the laser light is heated to exceed the Curie point $Tc_2$ of the second magnetic layer 4 and is increased to near the Curie point $Tc_1$ of the first magnetic layer 3. Since this temperature is lower than the compensation temperature $Tcomp_3$ of the third magnetic layer 5 and since the coercive force of the third magnetic layer 5 at this temperature is larger than the recording magnetic field $H_W$, the magnetization direction of the third magnetic layer 5 is not reversed by the recording magnetic field $H_W$. In the following process of lowering the temperature to room temperature, the second magnetic layer 4 exhibits perpendicular magnetization. At this time, as shown in the state S3, the magnetization direction of the first magnetic layer 3 is aligned with that of the third magnetic layer 5 through the second magnetic layer 4 in the same manner as mentioned above. Namely, both of the states S1 and S2 after the initialization change to state S3.

When the temperature decreases to room temperature, the second magnetic layer 4 shows in-plane magnetization, and the exchange forces do not act between the first magnetic layer 3 and the third magnetic layer 5. Then, the state changes from S3 to S1. As a result, the magnetization direction of the first magnetic layer 3 is aligned with the initializing magnetic field. Consequently, new information corresponding to the laser light modulated to low level II is written on the first magnetic layer 3.

The information thus recorded on the first magnetic layer 3 is reproduced by irradiating laser light of level III that is lower than that used for recording and by detecting a rotation of the plane of polarization of the reflected light as shown in FIG. 4.

The reproduction characteristics were measured and the results are explained below by giving detailed numerical values. First, recording was executed under the conditions where the initializing magnetic field Hinit was 80 kA/m, the recording magnetic field $H_W$ was 16 kA/m, the laser power ($P_H$) of high level I was 8 mW, the laser power ($P_L$) of low level II was 4 mW, and the recording bit length was 0.78 µm. As a result, light-intensity modulation overwriting was achieved without residual information. When reproduction was carried out by setting the reproduction laser power ($P_R$) of level III at 1 mW, a signal to noise ratio (C/N) was 47 dB.

In a conventional magneto-optical disk which has exchange-coupled two-layer films but not an intermediate layer 4 of this embodiment, it is necessary to set the initializing magnetic field Hinit at 240 kA/m. In this case, a device for generating a larger initializing magnetic field is required, preventing a reduction in the overall size of the device and in power consumption.

Moreover, in the conventional magneto-optical disk, it is necessary to set the laser power $P_H$ of the laser light of high level I for use recording at a value not lower than 10 mW and the recording magnetic field $H_W$ between 16 and 40 kA/m.

In this embodiment, however, as described above, overwriting with light-intensity modulation is feasible by a laser power $P_H$ of 8 mW and a recording magnetic field $H_W$ between 16 and 40 kA/m. Namely, in this embodiment, when the temperature is increased by the irradiation of laser light of high level I, since the first and second magnetic layers 3 and 4 exceed their Curie points, the magnetization direction of the third magnetic layer 5 is reversed by the recording magnetic field $H_W$ in a state in which the exchange forces from the first and second magnetic layers 3 and 4 do not function.

Therefore, when the recording magnetic field $H_W$ is larger the coercive force of the third magnetic layer 5 at high temperatures at the time of the irradiation of laser light of high level I, even if the laser power of the laser light of high level I is lowered or the recording magnetic field $H_W$ is decreased without considering the exchange forces from the first and second magnetic layers 3 and 4, the magnetization of the third magnetic layer 5 is certainly reversed in the manner mentioned above.

The composition and the film thickness of each of the first to third magnetic layers 3 to 5 of the above-mentioned magneto-optical disk (hereinafter referred to as sample #1) are not restricted to those mentioned above. It is possible to change them in various ways. 27 types of magneto-optical disks (hereinafter referred to as sample #2 to #28) were formed by changing the composition and magnetic properties thereof. Tables 1 to 3 show compositions and magnetic properties of magnetic layers which are different from sample #1. Table 4 shows the results of measurements of the reproduction characteristics of sample #2 to #28. Necessary items are picked from the above-mentioned explanation of sample #1 and recited in Tables 1 to 4.

Samples #2 to #8 are the same as sample #1 except the second magnetic layer 4 which has a different composition. The composition and magnetic properties of the second magnetic layer 4 are shown in Table 1. Similarly to sample #1, the second magnetic layer 4 is rare-earth metal rich and the coercive force $Hc_2$ at room temperature is substantially zero.

TABLE 1

Second Magnetic Layer

| Sample | Composition | Curie point $Tc_2$ (°C.) | Temp. (°C.) for perpendicular magnetization |
|---|---|---|---|
| #1 | $Dy_{0.29}(Fe_{0.80}Co_{0.20})_{0.71}$ | 140 | about 100 |
| #2 | $Dy_{0.29}(Fe_{0.70}Co_{0.30})_{0.71}$ | 160 | about 100 |
| #3 | $Dy_{0.27}(Fe_{0.80}Co_{0.20})_{0.73}$ | 150 | about 80 |
| #4 | $Dy_{0.27}(Fe_{0.70}Co_{0.30})_{0.73}$ | 170 | about 80 |
| #5 | $Dy_{0.31}(Fe_{0.80}Co_{0.20})_{0.69}$ | 120 | about 100 |
| #6 | $Dy_{0.31}(Fe_{0.70}Co_{0.30})_{0.69}$ | 140 | about 100 |
| #7 | $Dy_{0.30}(Fe_{0.95}Co_{0.05})_{0.70}$ | 170 | about 120 |
| #8 | $Dy_{0.32}(Fe_{0.95}Co_{0.05})_{0.68}$ | 175 | about 125 |

Samples #9 to #13 are the same as sample #1 except the composition of the first magnetic layer 3. The composition and magnetic properties of the first magnetic layer 3 of each sample are shown in Table 2. Similar to sample #1, the first magnetic layer 3 of each of samples #9 to #13 exhibits perpendicular magnetization within a temperature range between room temperature and the Curie point $Tc_1$. Samples #9, #12 and #13 have transition metal rich compositions like sample #1. Samples #10 and #11 have compensation compositions.

TABLE 2

First Magnetic Layer

| Sample | Composition | Curie point $Tc_1$ (°C.) | Coercive force $Hc_1$ at room temp. (kA/m) |
|---|---|---|---|
| #1 | $Dy_{0.21}(Fe_{0.81}Co_{0.19})_{0.79}$ | 180 | 1200 |
| #9 | $Dy_{0.21}(Fe_{0.75}Co_{0.25})_{0.79}$ | 200 | 1200 |
| #10 | $Dy_{0.23}(Fe_{0.70}Co_{0.30})_{0.77}$ | 210 | ≧1600 |
| #11 | $Dy_{0.23}(Fe_{0.75}Co_{0.25})_{0.77}$ | 190 | ≧1600 |
| #12 | $Dy_{0.10}(Fe_{0.84}Co_{0.16})_{0.81}$ | 200 | 640 |
| #13 | $Dy_{0.18}(Fe_{0.70}Co_{0.30})_{0.82}$ | 260 | 560 |

Samples #14 to #27 are the same as sample #1 except the composition of the third magnetic layer 5. The composition and magnetic properties of the third magnetic layer 5 of each sample are shown in Table 3. Like sample #1, the third magnetic layer 5 of each of samples #14 to #27 has a rare-earth metal rich composition and exhibits perpendicular magnetization within a temperature range between room temperature and the Curie point $Tc_3$.

TABLE 3

Third Magnetic Layer

| Sample | Composition | Curie point (°C.) | Compensation temp. (°C.) | Coercive force at room temp. (kA/m) |
|---|---|---|---|---|
| #1 | $(Gd_{0.40}Dy_{0.60})_{0.27}(Fe_{0.70}Co_{0.30})_{0.73}$ | 250 | 200 | 64 |
| #14 | $(Gd_{0.40}Dy_{0.60})_{0.25}(Fe_{0.70}Co_{0.30})_{0.75}$ | 250 | 200 | 64 |
| #15 | $(Gd_{0.42}Dy_{0.58})_{0.26}(Fe_{0.50}Co_{0.50})_{0.74}$ | 330 | 210 | 72 |
| #16 | $(Gd_{0.42}Dy_{0.58})_{0.24}(Fe_{0.50}Co_{0.50})_{0.76}$ | 370 | 170 | 56 |
| #17 | $(Gd_{0.42}Dy_{0.58})_{0.25}(Fe_{0.78}Co_{0.33})_{0.75}$ | 210 | 200 | 72 |
| #18 | $(Gd_{0.42}Dy_{0.58})_{0.27}(Fe_{0.43}Co_{0.57})_{0.73}$ | 290 | 270 | 16 |
| #19 | $(Gd_{0.14}Dy_{0.86})_{0.25}(Fe_{0.46}Co_{0.54})_{0.75}$ | 330 | 120 | 152 |
| #20 | $(Gd_{0.33}Dy_{0.67})_{0.27}(Fe_{0.47}Co_{0.53})_{0.73}$ | 350 | 190 | 40 |
| #21 | $(Gd_{0.75}Dy_{0.25})_{0.24}(Fe_{0.49}Co_{0.51})_{0.76}$ | 370 | 210 | 16 |
| #22 | $(Gd_{0.42}Dy_{0.58})_{0.27}(Fe_{0.40}Co_{0.50})_{0.73}$ | 330 | 220 | 24 |
| #23 | $(Gd_{0.52}Dy_{0.48})_{0.25}(Fe_{0.48}Co_{0.52})_{0.75}$ | 370 | 190 | 40 |
| #24 | $Dy_{0.29}(Fe_{0.70}Co_{0.30})_{0.71}$ | 200 | 160 | 176 |
| #25 | $Dy_{0.29}(Fe_{0.60}Co_{0.40})_{0.71}$ | 270 | 190 | 184 |
| #26 | $Dy_{0.30}(Fe_{0.50}Co_{0.50})_{0.70}$ | 250 | 160 | 160 |
| #27 | $Dy_{0.31}(Fe_{0.50}Co_{0.50})_{0.69}$ | 250 | 150 | 144 |

The difference between samples #1 and #28 is only the film thickness of the second magnetic layer 4. The film thickness of the second magnetic layer 4 in sample #1 was 50 nm, while the film thickness in sample #28 was 30 nm.

TABLE 4

| Sample | Hinit (kA/m) | $H_W$ (kA/m) | $P_H$ (mW) | $P_L$ (mW) | $P_R$ (mW) | Recording bit length (μm) | C/N (dB) |
|---|---|---|---|---|---|---|---|
| #1 | 80 | 16 | 8 | 4 | 1 | 0.78 | 47 |
| #2 | 80 | 16 | 8 | 4 | 1 | 0.78 | 47 |
| #3 | 80 | 16 | 8 | 4 | 1 | 0.78 | 47 |
| #4 | 80 | 16 | 8 | 3 | 1 | 0.78 | 47 |
| #5 | 80 | 16 | 8 | 3 | 1 | 0.78 | 47 |
| #6 | 80 | 16 | 8 | 4 | 1 | 0.78 | 47 |
| #7 | 80 | 16 | 8 | 5 | 1 | 0.78 | 47 |
| #8 | 80 | 16 | 8 | 3 | 1 | 0.78 | 47 |
| #9 | 80 | 16 | 8 | 4 | 1 | 0.78 | 47 |
| #10 | 80 | 16 | 8 | 4 | 1 | 0.78 | 47 |
| #11 | 80 | 16 | 8 | 4 | 1 | 0.78 | 47 |
| #12 | 80 | 16 | 8 | 3 | 1 | 0.78 | 47 |
| #13 | 160 | 16 | 8 | 4 | 1 | 0.78 | 48 |
| #14 | 80 | 16 | 8 | 3 | 1 | 0.78 | 47 |
| #15 | 80 | 24 | 8 | 4 | 1 | 0.78 | 47 |

TABLE 4-continued

| Sample | Hinit (kA/m) | $H_W$ (kA/m) | $P_H$ (mW) | $P_L$ (mW) | $P_R$ (mW) | Recording bit length (μm) | C/N (dB) |
|---|---|---|---|---|---|---|---|
| #16 | 80 | 32 | 8 | 4 | 1 | 0.78 | 47 |
| #17 | 80 | 16 | 8 | 3 | 1 | 0.78 | 47 |
| #18 | 80 | 40 | 8 | 4 | 1 | 0.78 | 47 |
| #19 | 160 | 16 | 8 | 4 | 1 | 0.78 | 47 |
| #20 | 160 | 24 | 8 | 4 | 1 | 0.78 | 47 |
| #21 | 80 | 24 | 8 | 3 | 1 | 0.78 | 47 |
| #22 | 80 | 32 | 8 | 4 | 1 | 0.78 | 47 |
| #23 | 80 | 40 | 8 | 4 | 1 | 0.78 | 47 |
| #24 | 200 | 32 | 8 | 4 | 1 | 0.78 | 47 |
| #25 | 200 | 40 | 8 | 4 | 1 | 0.78 | 47 |
| #26 | 200 | 16 | 8 | 4 | 1 | 0.78 | 47 |
| #27 | 200 | 16 | 8 | 4 | 1 | 0.78 | 47 |
| #28 | 80 | 16 | 8 | 4 | 1 | 0.78 | 47 |

As shown in Table 4, with any of samples #2 to #28, light-intensity modulation overwriting was achieved without residual information under the conditions shown in Table 4, and a signal to noise ratio (C/N) of 47 dB was obtained.

With sample #13, C/N of 46 dB was obtained. Namely, as shown in Table 2, for example, the recording and reproduction characteristics were improved compared with sample #1 by increasing the Curie point of the first magnetic layer 3.

On the other hand, with sample #28 in which the film thickness of the second magnetic layer 4 was thinner than that of sample #1, light-intensity modulation overwriting was achieved without residual information under the conditions shown in Table 4. Furthermore, satisfactory recording was performed even with a 40% duty of the recording pulse. Considering the duty of the recording pulse of sample 31 was 60%, a magneto-optical disk with higher recording sensitivity than sample #1 was obtained.

[Embodiment 2]

Figure 6:
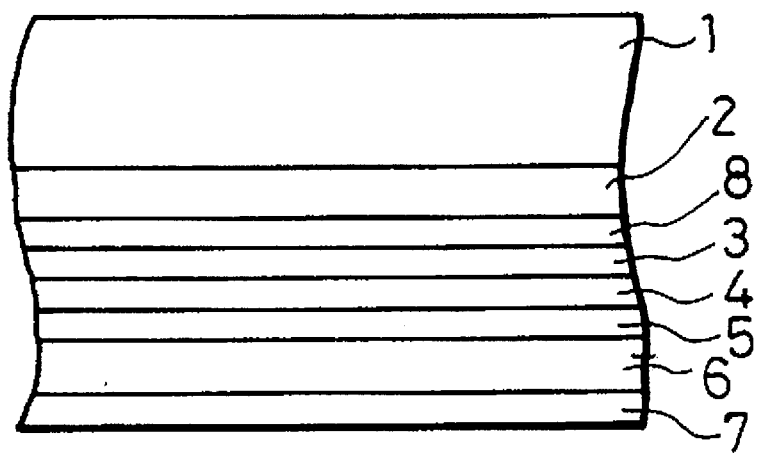
FIG. 6 is a depiction of a profile showing a schematic structure of a magneto-optical recording medium according to another embodiment of the present invention.

The following description discusses another embodiment of the present invention with reference to FIG. 6. The members having the same function as in the above-mentioned embodiment will be designated by the same code and their description will be omitted.

As illustrated in FIG. 6, a magneto-optical disk as a magneto-optical recording medium of this embodiment differs from the magneto-optical disk of Embodiment 1 because of a fourth magnetic layer 8 formed between the transparent dielectric transparent layer 2 and the first magnetic layer 3.

The fourth magnetic layer 8 is formed by an alloy of rare-earth and transition metal, GdFeCo, to have a film thickness of 30 nm by simultaneously sputtering Gd, Fe and Co targets. The fourth magnetic layer 8 has a rare-earth metal rich composition, $Gd_{0.25}(Fe_{0.80}Co_{0.20})_{0.75}$. The fourth magnetic layer 8 does not have a compensation point but has a higher Curie point $Tc_4$ (=300° C.) than the Curie point $Tc_1$ of the first magnetic layer 3. A coercive force $Hc_4$ at room temperature is substantially zero. The fourth magnetic layer 8 exhibits in-plane magnetization at room temperature and perpendicular magnetization around 100° C.

With the magneto-optical disk including the fourth magnetic layer 8 (hereinafter referred to as sample #29), light-intensity modulation overwriting was achieved without residual information under the recording conditions shown in Table 5. For comparison purposes, Table 5 also shows recording conditions of sample #1.

TABLE 5

| Sample | Hinit (kA/m) | $H_W$ (kA/m) | $P_H$ (mW) | $P_L$ (mW) | $P_R$ (mW) | Recording bit length (μm) | C/N (dB) |
|---|---|---|---|---|---|---|---|
| #1 | 80 | 16 | 8 | 4 | 1 | 0.78 | 47 |
| #29 | 160 | 16 | 8 | 4 | 2.5 | 0.78 | 49 |

The C/N (signal to noise ratio) of sample #1 was 47 dB, while a C/N of 49 dB was achieved in this embodiment. Thus, signal quality was improved in this embodiment. This may have been resulted from an increase in the Kerr rotation angle which was achieved by setting $Tc_4 > Tc_1$.

When the recording bit length became shorter, the C/N was abruptly decreased in sample #1. However, the C/N was not much decreased in sample #29. The reason for this is that the fourth magnetic layer 8 shows in-plane magnetization at room temperature, and perpendicular magnetization when laser light with reproduction laser power of level III is irradiated. It is thus possible to reproduce a short recording bit without having influence from adjacent recording bits.

More specifically, when reproduction-use laser light is irradiated on the fourth magnetic layer 8, the temperature distribution of the irradiated area becomes substantially Gaussian. At this time, the intensity of the laser light was adjusted so that the temperature of a central section whose diameter is smaller than the spot diameter of the laser light exceeds a temperature at which the fourth magnetic layer 8 exhibits perpendicular magnetization. In this case, only the magnetization of the central section of the fourth magnetic layer 8 changes from in-plane magnetization to perpendicular magnetization. The magnetization direction of the fourth magnetic layer 8 is aligned with that of the first magnetic layer 3 by the exchange forces between the area of the fourth magnetic layer 8 exhibiting perpendicular magnetization and the first magnetic layer 3.

As a result, only the central section of the irradiated area shows a polar Kerr effect, and information is reproduced based on reflected light from the irradiated area.

When the laser light moves and irradiates another area to reproduce the next recording bit, the temperature of the previously reproduced area decreases and the magnetization changes from perpendicular magnetization to in-plane magnetization. Consequently, the polar Kerr effect is not observed. This means that the magnetization recorded on the first magnetic layer 3 is masked by the in-plane magnetization of the fourth magnetic layer 8 and thus cannot be read. This prevents mixture of signals from adjacent bits which causes noise and lowers the resolution of reproduction. As a result, reproduction is performed by involving only an area smaller than a spot diameter of the laser light in reproduction. It is thus possible to reproduce a smaller recording bit and improve the recording density.

As described above, in the magneto-optical disks of the above-mentioned embodiments, rewriting of information by overwriting, i.e., overwriting with light-intensity modulation is feasible by irradiating laser light whose intensity is modulated between high level I and low level II while applying the recording magnetic field $H_W$ after the initialization.

Moreover, since the second magnetic layer 4 formed between the first and third magnetic layers 3 and 5 exhibits substantially in-plane magnetization at room temperature and has a Curie point lower than the Curie points of the first and third magnetic layers 3 and 5, it is possible to reduce the initializing magnetic field Hinit as well as the power of the recording-use laser light or the recording magnetic field $H_W$. Furthermore, since the magnetic coupling between the third magnetic layer 5 and the first and second magnetic layers 3 and 4 is satisfactorily limited, even if there are variations in the raised temperature at the time of the irradiation of laser light of high level I, light-intensity modulation overwriting is stably performed.

In addition, in the above-mentioned embodiments, since the third magnetic layer 5 has a compensation temperature $Tcomp_3$ between room temperature and the Curie point $Tc_3$, it is possible to align the initializing magnetic field Hinit and the recording magnetic field $H_W$ in the same direction. It is thus possible to closely dispose both of generating sections for generating the respective magnetic fields in the device or determine the initializing magnetic field Hinit and the recording magnetic field $H_W$ depending on a combination of magnetic fields produced by the generating sections. As a result, the size and power consumption of the device are reduced.

[Embodiment 3]

The following description discusses another embodiment of the present invention with reference to FIGS. 7 to 11. The members having the same function as in the above-mentioned embodiment will be designated by the same code and their description will be omitted.

Figure 8:
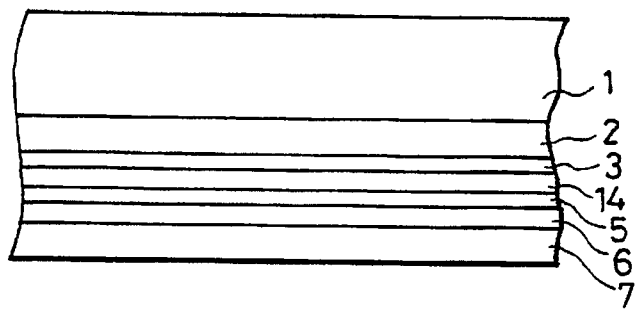
FIG. 8 is a depiction of a profile showing a schematic structure of the magneto-optical recording medium.

As illustrated in FIG. 8, a magneto-optical disk as a magneto-optical recording medium of this embodiment differs from the magneto-optical disk of Embodiment 1 because a second magnetic layer 14 is formed between the first magnetic layer 3 and the third magnetic layer 5 instead of the second magnetic layer 4.

Figure 9:
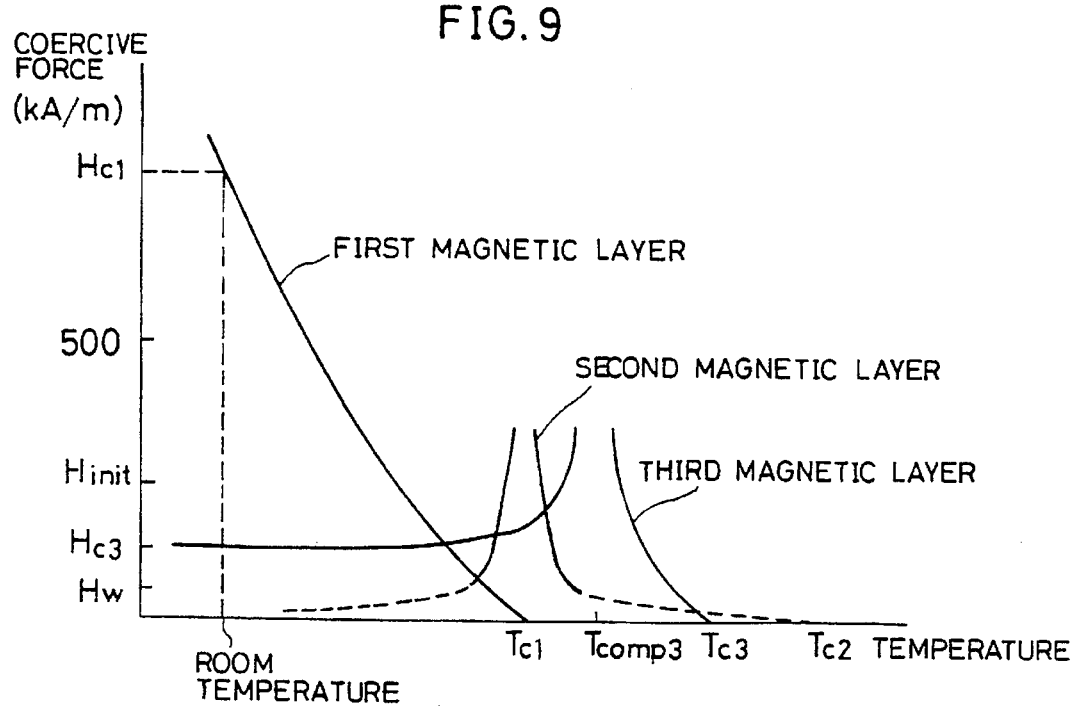
FIG. 9 is a graph showing the temperature dependence of coercive force of each of the first to third magnetic layer in the magneto-optical recording medium.

The second magnetic layer 14 on the first magnetic layer 3 is formed by an alloy of rare-earth and transition metal, GdFeCo, to have a film thickness of 50 nm by simultaneously sputtering Gd, Fe and Co targets. The second magnetic layer 14 has a rare-earth metal rich composition, $Gd_{0.27}(Fe_{0.60}Co_{0.40})_{0.73}$. The Curie point $Tc_2$ of the second magnetic layer 14 is higher than the Curie point $Tc_1$ of the first magnetic layer 3 and is not lower than 300° C. A compensation point $Tcomp_2$ thereof is 120° C. and the coercive force $Hc_2$ thereof at room temperature is substantially zero. The second magnetic layer 14 exhibits in-plane magnetization at room temperature. When the temperature is raised to around 80 °C., the second magnetic layer 14 exhibits perpendicular magnetization. In addition, it shows in-plane magnetization around 160° C. In FIG. 9, a range within which perpendicular magnetization is exhibited is indicated by the broken line.

Figure 10:
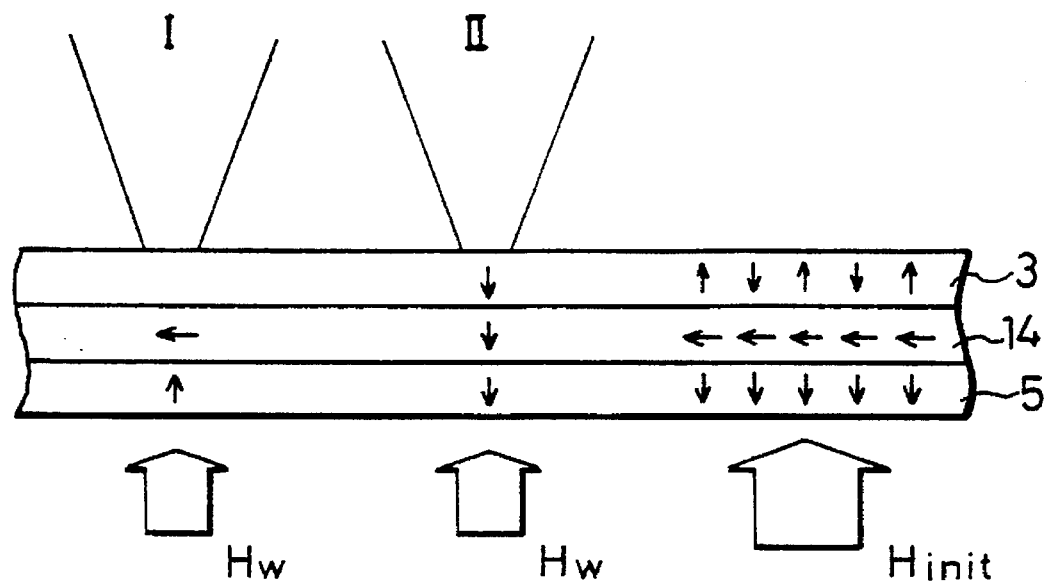
FIG. 10 is an explanatory view showing a recording process with respect to the magneto-optical recording medium.
Figure 11:
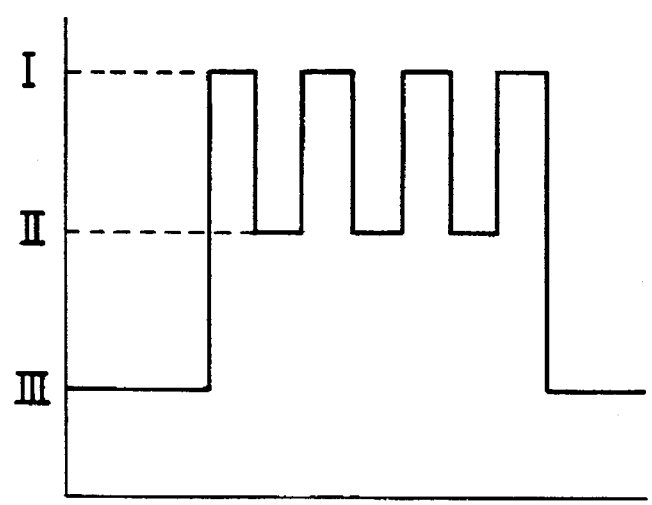
FIG. 11 is an explanatory view showing the intensity of laser light to be irradiated on the magneto-optical recording medium.
Figure 14:
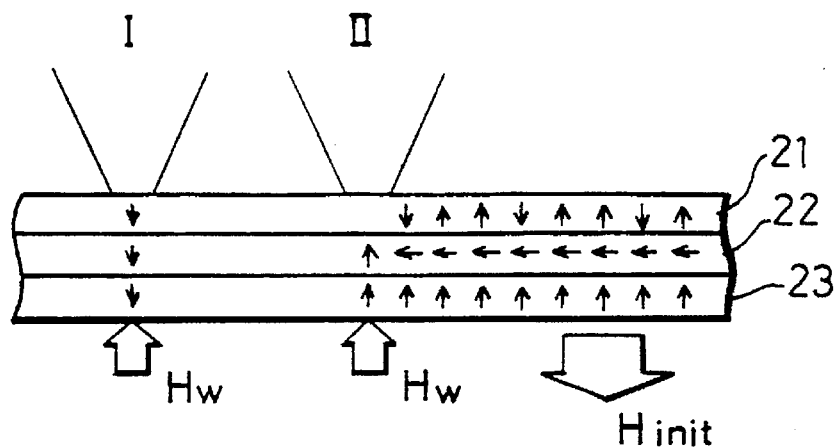
FIG. 14 is an explanatory view showing the structure of and a recording process with respect to a conventional magneto-optical recording medium.
Figure 15:
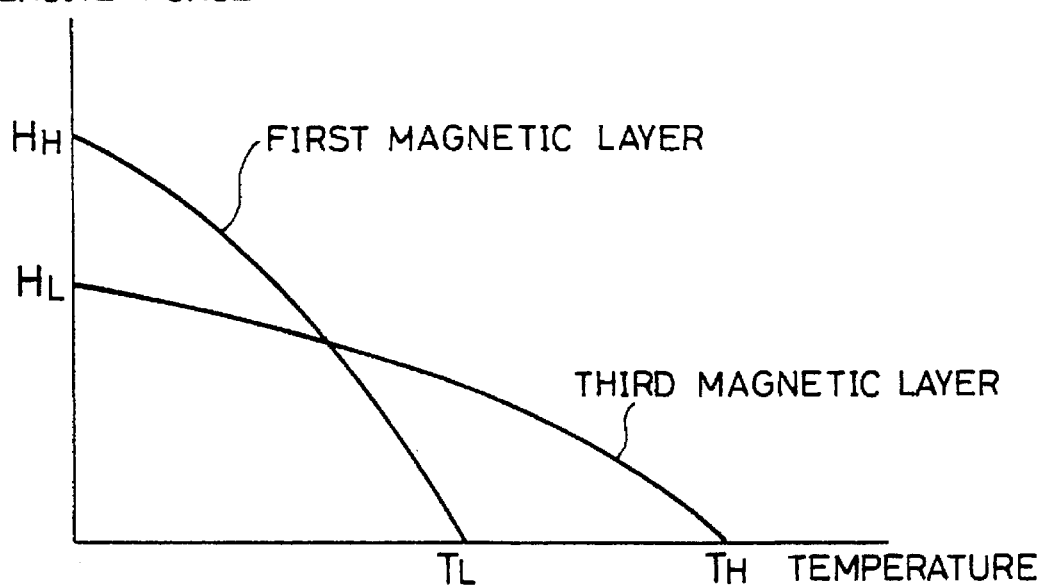
FIG. 15 is a graph showing the temperature dependence of coercive force of each of the first and third magnetic layers in the magneto-optical recording medium of FIG. 14.

The second magnetic layer 14 shows perpendicular magnetization within a temperature range near the Curie point $Tc_1$ of the first magnetic layer 3. Specifically, the temperature range showing perpendicular magnetization includes at least a range from the Curie point $Tc_1$ of the first magnetic layer 3 to a temperature slightly higher than a temperature at which the characteristic curve of the coercive force of the first magnetic layer 3 which is decreased with an increase of the temperature intersects the characteristic curve of the coercive force of the third magnetic layer 5. In-plane magnetization is exhibited within a temperature range near room temperature at which the coercive force of the first magnetic layer 3 is larger than that of the third magnetic layer 5 and at temperatures higher than temperatures near the compensation temperature $Tcomp_3$ of the third magnetic layer 5. When recording information on a magneto-optical disk having the above-mentioned structure, as illustrated in FIG. 10, first, for example, an upward initializing magnetic field Hinit is applied to carry out initialization. Then, as shown in FIG. 11, laser light whose intensity is modulated between high level I and low level II is irradiated while applying the recording magnetic field $H_W$ whose direction is equal to that of the initializing magnetic field Hinit and whose strength is sufficiently smaller than Hinit. Consequently, information is recorded.

Figure 7:
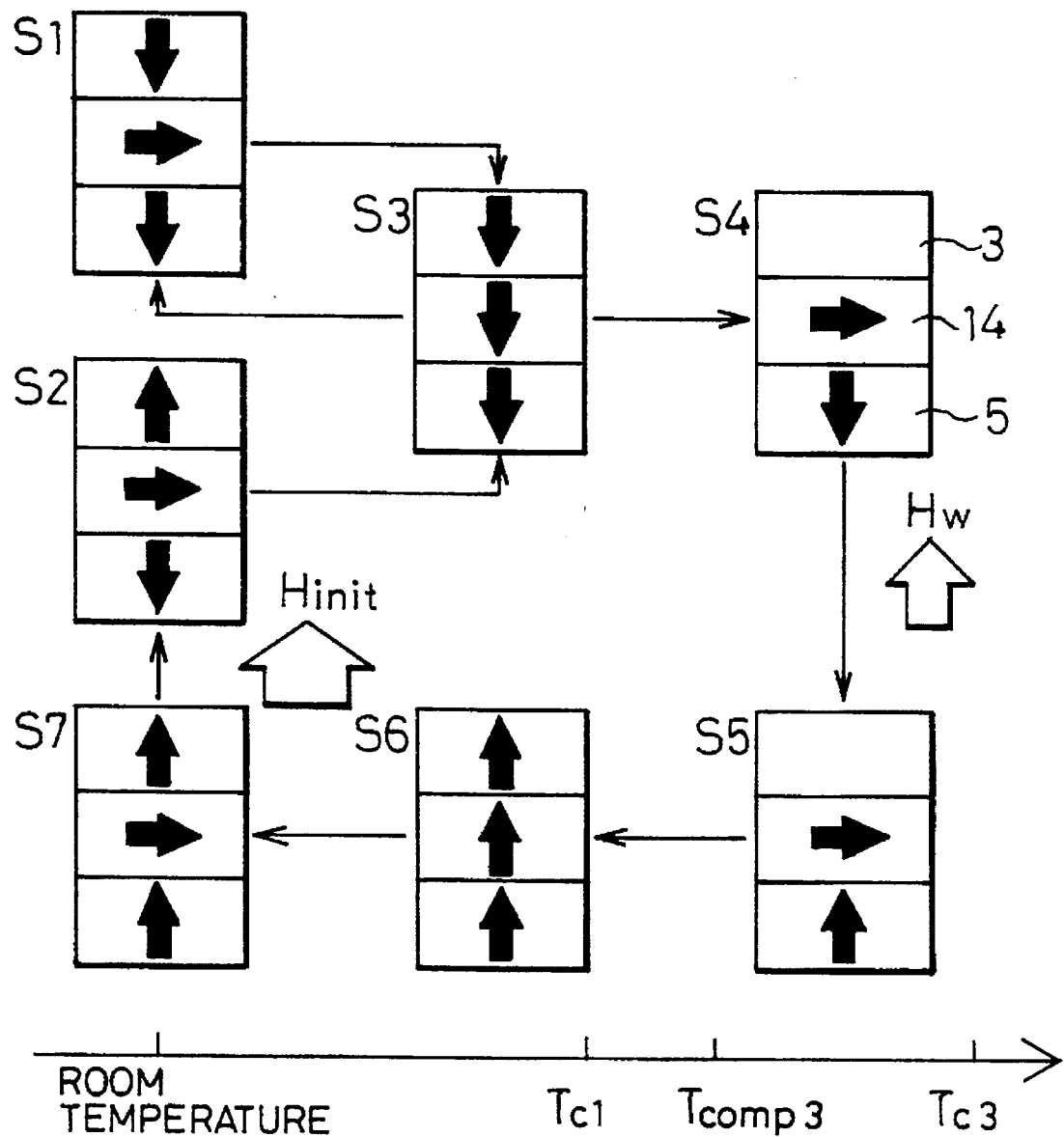
FIG. 7 is an explanatory view showing changes in the state of magnetization of a magneto-optical recording medium according to still another embodiment during recording.

Variations in the state of magnetization of the magnetic layers 3, 14 and 5 during recording of information are explained below with reference to FIG. 7. In FIG. 7, horizontal axis indicates temperatures. The temperatures show variations in the state of magnetization of the magnetic layers 3, 14 and 5 when the initializing magnetic field Hinit is applied at room temperature, and when the temperature is raised by the irradiation of laser light of high level I and low level II while applying the recording magnetic field $H_W$. All of the magnetic layers 3, 14 and 5 are formed by rare-earth and transition metal alloys. In this case, it is possible to show the direction of magnetization of the magnetic layers 3, 14 and 5 by the total magnetization, the magnetization of the sub-lattice of the rare-earth metal or the magnetization of the sub-lattice of transition metal. In FIG. 7, the arrows indicate the direction of magnetization of the sub-lattice of the transition metal of the magnetic layers 3, 14 and 5, respectively.

When the initializing magnetic field Hinit is applied at room temperature, the direction of magnetization of each of the magnetic layers 3, 14 and 5 becomes either of the two stable states S1 and S2 shown in FIG. 7. In this case, the initializing magnetic field Hinit is set to take a value between the coercive force $Hc_1$ (=1200 kA/m) of the first magnetic layer 3 and $Hc_3$ (=64 kA/m) of the third magnetic layer 5 at room temperature. For example, the initializing magnetic field Hinit is set at 80 kA/m. Therefore, only the magnetization of the third magnetic layer 5 is oriented in one direction along the initializing magnetic filed Hinit by the initialization. For instance, when the initializing magnetic field Hinit is applied in an upward direction and when the total magnetization of the third magnetic layer 5 is aligned with the orientation of the initializing magnetic filed Hinit, since the third magnetic layer 5 is rare-earth metal rich, the magnetization direction of the sub-lattice of the transition metal is aligned with a downward direction that is opposite to the orientation of the initializing magnetic field Hinit.

At this time, the coercive force $Hc_1$ of the first magnetic layer 3 is sufficiently larger than Hinit, and the second magnetic layer 4 exhibits in-plane magnetization at room temperature. Therefore, the magnetization direction of the third magnetic layer 5 is not copied to the first magnetic layer 3 through the second magnetic layer 14, and thus the magnetization direction of the first magnetic layer 3 is not reversed. As a result, the first magnetic layer 3 keeps the magnetization in the direction corresponding to the recorded state. Namely, the first magnetic layer 3 is in the state Si or S2.

In the structure where the initializing magnetic field Hinit is applied by a permanent magnet installed in a recording and reproducing device, initialization is always performed during rotations of the magneto-optical disk. Whereas in a device in which the initializing magnetic field Hinit is applied by an electromagnet, for example, initialization is only performed during recording.

After performing the initialization, laser light whose intensity is modulated between high level I and low level II depending on information to be recorded is irradiated while applying the recording magnetic field $H_W$ (for example, 16 kA/m) in the manner as described above.

The laser power of the laser light of high level I is set so that the temperature of the irradiated area exceeds the Curie points $Tc_1$ of the first magnetic layer 3 and is increased to near or above the Curie point $Tc_3$ (=250° C.) of the third magnetic layer 5. On the other hand, the laser power of the laser light of low level II is set so that the temperature of the irradiated area is increased to near the Curie point $Tc_1$ (=180° C.) of the first magnetic layer 3.

Therefore, first, laser light of high level I is irradiated. In the above-mentioned process of raising the temperature of the irradiated area, the states S1 and S2 change to S5 through S3 and S4. More specifically, in S3, since the second magnetic layer 14 temporarily exhibits perpendicular magnetization in the process of raising the temperature, magnetic coupling forces (exchange forces) from the third magnetic layer 5 act on the first magnetic layer 3 through the second magnetic layer 14. As a result, the magnetization direction of the first magnetic layer 3 is aligned with that of the third magnetic layer 5. When the temperature of the first magnetic layers 3 is raised to exceed the Curie points $Tc_1$ through the state S3, the magnetization becomes zero as shown in S4 and S5.

In the process of raising the temperature, the magnetization of the second magnetic layer 14 temporarily changes from in-plane magnetization to perpendicular magnetization as shown in S3 and then changes to in-plane magnetization as shown in S4 and S5.

On the other hand, as shown in the state S3 in the course of raising the temperature, the magnetization of the third magnetic field 5 is maintained in the direction in which the magnetization is forcefully oriented by the initialization. When the third magnetic layer 5 is heated to a temperature near the Curie point $Tc_3$, the coercive force thereof is decreased. Consequently, as shown by a change from S4 to S5, the magnetization direction of the third magnetic layer 5 is reversed along the direction of the recording magnetic field $H_W$ being applied.

When the third magnetic layer 5 is heated as mentioned above, the temperature thereof exceeds its compensation temperature $Tcomp_3$ (=200 ° C.) at the time the state changes from S3 to S4. At this time, the relation between the strength of magnetization of the sub-lattice of the rare-earth metal and that of the transition metal of the third magnetic layer 5 is reversed. Therefore, unlike the state at room temperature, in the states S4 and S5, the magnetization direction of the sub-lattice of the transition metal of the third magnetic layer 5 is equal to the direction of the total magnetization. Thus, as illustrated in S4 to S5 of FIG. 7, the magnetization direction of the sub-lattice of the transition metal of the third magnetic layer 5 is reversed by the recording magnetic field $H_W$ whose direction is equal to the direction of the initializing magnetic field Hinit.

When the magnetization direction is reversed in such a manner, since the second magnetic layer 14 exhibits in-plane magnetization, the exchange forces from the magnetic layer 14 do not act on the third magnetic layer 5, thereby reducing the recording magnetic field $H_W$ for reversing the magnetization direction of the third magnetic layer 5.

As described above, after the magnetization direction of the third magnetic layer 5 is reversed along the direction of the recording magnetic field $H_W$, when the laser light irradiates another area due to the rotation of the magneto-optical disk, the temperature of the previously irradiated area is decreased to room temperature. In the process of cooling, the second magnetic layer 4 once shows perpendicular magnetization. At this time, the magnetization direction is aligned with the magnetization direction of the third magnetic layer 5 as shown in S6 by the exchange forces acting on the boundary of the second and third magnetic layers 14 and 5. Moreover, the magnetization direction of the first magnetic layer 3 is aligned with the magnetization direction of the second magnetic layer 14 by the exchange forces acting on the boundary of the first and second magnetic layers 3 and 14.

Then, when the temperature of the irradiated area decreases to room temperature, the second magnetic layer 14 again exhibits in-plane magnetization as shown in S7. Consequently, the exchange forces do not function on the boundary of the first and third magnetic layers 3 and 5.

In this state, even if the magneto-optical disk is rotated and the initializing magnetic field Hinit is applied at room temperature, the magnetization direction of the first magnetic layer 3 having a large coercive force does not change, and only the magnetization direction of the third magnetic layer 5 having a small coercive force is reversed as mentioned above. Then, the state is changed from S7 to S2. Thus, information reversing the magnetization direction produced by the initialization, i.e., information written according to the laser light modulated to high level I is stored.

The following description explains changes in the state of magnetization of each of the magnetic layers 3, 14 and 5 when laser light of low level II is irradiated while applying the recording magnetic field $H_W$ after the initialization.

At this time, the area irradiated by the laser light is heated only to a temperature near the Curie point $Tc_1$ of the first magnetic layer 3. Since this temperature is lower than the compensation temperature $Tcomp_3$ of the third magnetic layer 5 and the coercive force of the third magnetic layer 5 is larger than the recording magnetic field $H_W$ at this temperature, the magnetization direction of the third magnetic layer 5 is not reversed by the recording magnetic field $H_W$ as shown in S3. Around this temperature, since the second magnetic layer 14 exhibits perpendicular magnetization, the magnetization direction of the first magnetic layer 3 is aligned with that of the third magnetic layer 5 in the same manner as mentioned above. Namely, the states S1 and S2 after the initialization change to state S3.

Thereafter, when the laser light irradiates another area due to the rotation of the magneto-optical disk and when the temperature decreases to room temperature, the second magnetic layer 14 shows in-plane magnetization, and the exchange forces do not function on the boundary of the first and third magnetic layers 3 and 5. Then, the state changes from S3 to S1. As a result, the magnetization of the first magnetic layer 3 remains in the direction in which the magnetization is aligned by the initialization. Consequently, new information corresponding to the laser light modulated to low level II is stored.

The information thus recorded on the first magnetic layer 3 is reproduced by irradiating laser light of level III that is lower than that used for recording and by detecting a rotation of the plane of polarization of the reflected light as shown in FIG. 11.

The reproduction characteristics were measured and the results are explained below by giving detailed numerical values. First, recording was executed under the conditions where the initializing magnetic field Hinit was 80 kA/m, the recording magnetic field $H_W$ was 16 kA/m, the laser power ($P_H$) of high level I was 8 mW, the laser power ($P_L$) of low level II was 4 mW, and the recording bit length was 0.78 μm. As a result, light-intensity modulation overwriting was achieved without residual information. When reproduction was carried out by setting the reproduction laser power ($P_R$) of level III at 1 mW, a signal to noise ratio (C/N) was 47 dB.

is decreased without considering the exchange forces from the second magnetic layer 14, the magnetization of the third magnetic layer 5 is certainly reversed in the manner mentioned above.

The composition and the film thickness of each of the first to third magnetic layers 3, 14 and 5 of the above-mentioned magneto-optical disk (hereinafter referred to as sample #30) are not restricted to those mentioned above. It is thus possible to change them in various ways. 26 types of magneto-optical disks (hereinafter referred to as samples #31 to #56) were formed by changing the composition thereof. Tables 6 to 8 show compositions and magnetic properties of magnetic layers which are different from sample #30, and Table 9 shows the results of measurements of the reproduction characteristics of samples #31 to #56. Necessary items are picked from the above-mentioned explanation of sample #30 and recited in Tables 6 to 8.

Samples #31 to #37 are the same as sample #30 except the second magnetic layer 14 which has a different composition. The composition and magnetic properties of the second magnetic layer 14 are shown in Table 6. Similarly to sample #30, the second magnetic layer 14 is rare-earth metal rich and the coercive force $Hc_2$ at room temperature is substantially zero.

TABLE 6

Second Magnetic Layer

| Sample | Composition | Curie point $Tc_2$ (°C.) | Compensation temp. (°C.) | Temp. for perpendicular magnetization (°C.) | Temp. for in-plane magnetization (°C.) |
|---|---|---|---|---|---|
| #30 | $(Gd_{0.27}(Fe_{0.60}Co_{0.40})_{0.73}$ | ≧300 | 120 | about 80 | about 160 |
| #31 | $(Gd_{0.28}(Fe_{0.60}Co_{0.40})_{0.72}$ | 300 | 140 | about 100 | about 180 |
| #32 | $(Gd_{0.29}(Fe_{0.60}Co_{0.40})_{0.71}$ | 280 | 160 | about 120 | about 200 |
| #33 | $(Gd_{0.28}(Fe_{0.70}Co_{0.30})_{0.72}$ | 300 | 140 | about 80 | about 200 |
| #34 | $(Gd_{0.29}(Fe_{0.70}Co_{0.30})_{0.71}$ | 290 | 160 | about 100 | about 220 |
| #35 | $(Gd_{0.30}(Fe_{0.70}Co_{0.30})_{0.70}$ | 280 | 180 | about 120 | about 240 |
| #36 | $(Gd_{0.26}(Fe_{0.55}Co_{0.45})_{0.74}$ | ≧300 | 100 | about 80 | about 120 |
| #37 | $(Gd_{0.27}(Fe_{0.55}Co_{0.45})_{0.73}$ | ≧300 | 120 | about 100 | about 140 |

In a conventional magneto-optical disk which has exchange-coupled two-layer films but not the second magnetic layer 14 of this embodiment, it is necessary to set the initializing magnetic field Hinit at 240 kA/m. In this case, a device for generating a larger initializing magnetic field is required, preventing a reduction in the overall size of the device and in power consumption.

Moreover, in the conventional magneto-optical disk, it is necessary to set the laser power $P_H$ of the laser light of high level I for use recording not lower than 10 mW and the recording magnetic field $H_W$ between 16 and 40 kA/m. In this embodiment, however, as described above, overwriting with light-intensity modulation is feasible by a laser power $P_H$ of 8 mW and a recording magnetic field $H_W$ between 16 and 40 kA/m. Namely, in this embodiment, when the temperature is increased by the irradiation of laser light of high level I, since the second magnetic layer 14 exhibits in-plane magnetization, the magnetization direction of the third magnetic layer 5 is reversed in a state in which the exchange forces from the second magnetic layer 14 do not act.

Therefore, when the recording magnetic field $H_W$ is larger than the coercive force of the third magnetic layer 5 which is heated to a high temperature by the irradiation of laser light of high level I, even if the laser power of the laser light of high level I is lowered or the recording magnetic field $H_W$ Samples #38 to #41 are the same as sample #30 except the composition of the first magnetic layer 3. The composition and the magnetic properties of the first magnetic layer 3 of each sample are shown in Table 7. Similar to sample #30, the first magnetic layer 3 of each of samples #38 to #41 exhibits perpendicular magnetization within a temperature range between room temperature and the Curie point $Tc_1$. Samples #38 and #41 have transition metal rich compositions like sample #30. Samples #39 and #40 have compensation compositions.

TABLE 7

First Magnetic Layer

| Sample | Composition | Curie point $Tc_1$ (°C.) | Coercive force $Hc_1$ at room temp. (kA/m) |
|---|---|---|---|
| #30 | $Dy_{0.21}(Fe_{0.81}Co_{0.19})_{0.79}$ | 180 | 1200 |
| #38 | $Dy_{0.21}(Fe_{0.84}Co_{0.16})_{0.79}$ | 170 | 1200 |
| #39 | $Dy_{0.23}(Fe_{0.84}Co_{0.16})_{0.77}$ | 150 | ≧1600 |
| #40 | $Dy_{0.23}(Fe_{0.80}Co_{0.20})_{0.77}$ | 165 | ≧1600 |
| #41 | $Dy_{0.19}(Fe_{0.84}Co_{0.16})_{0.81}$ | 200 | 640 |

Samples #42 to #55 are the same as sample #30 except the composition of the third magnetic layer 5. The composition and the magnetic properties of the third magnetic layer 5 of each sample are shown in Table 8. Similar to sample #30, the third magnetic layer 5 of each of samples #42 to #55 has a rare-earth metal rich composition and exhibits perpendicular magnetization within a temperature range between room temperature and the Curie point $Tc_3$.

With sample #56 having the second magnetic layer 14 whose film thickness is thinner than that of sample #30, light-intensity modulation overwriting was achieved without residual information under the conditions shown in Table 9. Moreover, satisfactory recording was performed even with a 40% duty of the recording pulse. Considering the duty of the

TABLE 8

Third Magnetic Layer

| Sample | Composition | Curie point (°C.) | Compensation temp. (°C.) | Coercive force at room temp. (kA/m) |
|---|---|---|---|---|
| #30 | $(Gd_{0.40}Dy_{0.60})_{0.27}(Fe_{0.70}Co_{0.30})_{0.73}$ | 250 | 200 | 64 |
| #42 | $(Gd_{0.40}Dy_{0.60})_{0.25}(Fe_{0.70}Co_{0.30})_{0.75}$ | 250 | 200 | 64 |
| #43 | $(Gd_{0.42}Dy_{0.58})_{0.26}(Fe_{0.50}Co_{0.50})_{0.74}$ | 330 | 210 | 72 |
| #44 | $(Gd_{0.42}Dy_{0.58})_{0.24}(Fe_{0.50}Co_{0.50})_{0.76}$ | 370 | 170 | 56 |
| #45 | $(Gd_{0.42}Dy_{0.58})_{0.25}(Fe_{0.78}Co_{0.22})_{0.75}$ | 210 | 200 | 76 |
| #46 | $(Gd_{0.42}Dy_{0.58})_{0.27}(Fe_{0.43}Co_{0.57})_{0.73}$ | 290 | 270 | 16 |
| #47 | $(Gd_{0.14}Dy_{0.86})_{0.25}(Fe_{0.46}Co_{0.54})_{0.75}$ | 330 | 120 | 152 |
| #48 | $(Gd_{0.33}Dy_{0.67})_{0.27}(Fe_{0.47}Co_{0.53})_{0.73}$ | 350 | 190 | 40 |
| #49 | $(Gd_{0.75}Dy_{0.25})_{0.24}(Fe_{0.49}Co_{0.51})_{0.76}$ | 370 | 210 | 16 |
| #50 | $(Gd_{0.42}Dy_{0.58})_{0.27}(Fe_{0.40}Co_{0.60})_{0.73}$ | 330 | 220 | 24 |
| #51 | $(Gd_{0.52}Dy_{0.48})_{0.25}(Fe_{0.48}Co_{0.52})_{0.75}$ | 370 | 190 | 40 |
| #52 | $Dy_{0.29}(Fe_{0.70}Co_{0.30})_{0.71}$ | 200 | 160 | 176 |
| #53 | $Dy_{0.29}(Fe_{0.60}Co_{0.40})_{0.71}$ | 270 | 190 | 184 |
| #54 | $Dy_{0.30}(Fe_{0.50}Co_{0.50})_{0.70}$ | 250 | 160 | 160 |
| #55 | $Dy_{0.31}(Fe_{0.50}Co_{0.50})_{0.69}$ | 250 | 150 | 144 |

The difference between samples #30 and #56 is only the film thickness of the second magnetic layer 14. The film thickness of the second magnetic layer 14 was 50 nm in sample #30, while it was 30 nm in sample #56.

recording pulse of sample #30 was 60%, a magneto-optical disk with higher recording sensitivity than sample #30 was obtained.

TABLE 9

| Sample | Hinit (kA/m) | $H_W$ (kA/m) | $P_H$ (mW) | $P_L$ (mW) | $P_R$ (mW) | Recording bit length (μm) | C/N (dB) |
|---|---|---|---|---|---|---|---|
| #30 | 80 | 16 | 8 | 4 | 1 | 0.78 | 47 |
| #31 | 80 | 16 | 8 | 4 | 1 | 0.78 | 47 |
| #32 | 80 | 16 | 8 | 4 | 1 | 0.78 | 47 |
| #33 | 80 | 16 | 8 | 3 | 1 | 0.78 | 47 |
| #34 | 80 | 16 | 8 | 3 | 1 | 0.78 | 47 |
| #35 | 80 | 16 | 8 | 4 | 1 | 0.78 | 47 |
| #36 | 80 | 16 | 8 | 5 | 1 | 0.78 | 47 |
| #37 | 80 | 16 | 8 | 3 | 1 | 0.78 | 47 |
| #38 | 80 | 16 | 8 | 4 | 1 | 0.78 | 47 |
| #39 | 80 | 16 | 8 | 4 | 1 | 0.78 | 47 |
| #40 | 80 | 16 | 8 | 4 | 1 | 0.78 | 47 |
| #41 | 80 | 16 | 8 | 3 | 1 | 0.78 | 47 |
| #42 | 80 | 16 | 8 | 3 | 1 | 0.78 | 47 |
| #43 | 80 | 24 | 8 | 4 | 1 | 0.78 | 47 |
| #44 | 80 | 32 | 8 | 4 | 1 | 0.78 | 47 |
| #45 | 80 | 16 | 8 | 3 | 1 | 0.78 | 47 |
| #46 | 80 | 40 | 8 | 4 | 1 | 0.78 | 47 |
| #47 | 160 | 16 | 8 | 4 | 1 | 0.78 | 47 |
| #48 | 160 | 24 | 8 | 4 | 1 | 0.78 | 47 |
| #49 | 80 | 24 | 8 | 3 | 1 | 0.78 | 47 |
| #50 | 80 | 32 | 8 | 4 | 1 | 0.78 | 47 |
| #51 | 80 | 40 | 8 | 4 | 1 | 0.78 | 47 |
| #52 | 200 | 32 | 8 | 4 | 1 | 0.78 | 47 |
| #53 | 200 | 40 | 8 | 4 | 1 | 0.78 | 47 |
| #54 | 200 | 16 | 8 | 4 | 1 | 0.78 | 47 |
| #55 | 200 | 16 | 8 | 4 | 1 | 0.78 | 47 |
| #56 | 80 | 16 | 8 | 4 | 1 | 0.78 | 47 |

As shown in Table 9, with any of samples #31 to #55, light-intensity modulation overwriting was achieved without residual information under the conditions shown in Table 9 and a signal to noise ratio (C/N) of 47 dB was obtained.

[Embodiment 4]

The following description discusses another embodiment of the present invention with reference to FIG. 12. The members having the same function as in Embodiment 3 will be designated by the same code and their description will be omitted.

As illustrated in FIG. 12, the difference between a magneto-optical disk as a magneto-optical recording medium of this embodiment and that in the above-mentioned embodiment is an inclusion of the fourth magnetic layer 8 between the transparent dielectric transparent layer 2 and the first magnetic layer 3 in addition to the structure of Embodiment 3.

The fourth magnetic layer 8 is formed by an alloy of rare-earth and transition metal, GdFeCo, to have a film thickness of 30 nm by simultaneously sputtering Gd, Fe and Co targets. The fourth magnetic layer 8 has a rare-earth metal rich composition, $Gd_{0.25}(Fe_{0.80}Co_{0.20})_{0.75}$. The fourth magnetic layer 8 does not have a compensation point but has a higher Curie point $Tc_4$ (=300° C.) than the Curie point $Tc_1$ of the first magnetic layer 3. The coercive force $Hc_4$ thereof at room temperature is substantially zero. The fourth magnetic layer 8 exhibits in-plane magnetization at room temperature and perpendicular magnetization around 100° C.

With the magneto-optical disk including the fourth magnetic layer 8 (hereinafter referred to as sample #57), light-intensity modulation overwriting was achieved without residual information under the recording conditions shown in Table 10. For comparison purposes, Table 10 shows recording conditions of sample #30.

TABLE 10

| Sample | Hinit (kA/m) | $H_W$ (kA/m) | $P_H$ (mW) | $P_L$ (mW) | $P_R$ (mW) | Recording bit length (μm) | C/N (dB) |
|---|---|---|---|---|---|---|---|
| #30 | 80 | 16 | 8 | 4 | 1 | 0.78 | 47 |
| #57 | 160 | 16 | 8 | 4 | 2 | 0.78 | 49 |

The C/N (signal to noise ratio) was 47 dB in sample #30, while a C/N of 49 dB was achieved in this embodiment. Thus, signal quality was improved. This may have been resulted from an increase in the Kerr rotation angle which was achieved by setting $Tc_4 > Tc'_1$.

When the recording bit length became shorter, the C/N was abruptly decreased in sample #30. However, the C/N was not much decreased in sample #57. The reason for this is that the fourth magnetic layer 8 shows in-plane magnetization at room temperature, and perpendicular magnetization when laser light with reproduction laser power of level III is irradiated. It is thus possible to reproduce a short recording bit without having influence from adjacent recording bits.

More specifically, when reproduction-use laser light is irradiated on the fourth magnetic layer 8, the temperature distribution of the irradiated area becomes substantially Gaussian. At this time, the intensity of the laser light is adjusted so that the temperature of a central section whose diameter is smaller than the spot diameter of the laser light exceeds a temperature at which the fourth magnetic layer 8 exhibits perpendicular magnetization. In this case, only the magnetization of the central section of the fourth magnetic layer 8 changes from in-plane magnetization to perpendicular magnetization. The magnetization direction of the fourth magnetic layer 8 is aligned with that of the first magnetic layer 3 by the exchange forces between the area of the fourth magnetic layer 8 exhibiting perpendicular magnetization and the first magnetic layer 3.

As a result, only the central section of the irradiated area shows a polar Kerr effect, and information is reproduced based on reflected light from the irradiated area.

When the laser light moves and irradiates another area to reproduce the next recording bit, the temperature of the previously reproduced area is lowered and the magnetization changes from perpendicular magnetization to in-plane magnetization. Accordingly, the polar Kerr effect is not observed. This means that the magnetization recorded on the first magnetic layer 3 is masked by the in-plane magnetization of the fourth magnetic layer 8 and thus cannot be read. This prevents mixture of signals from adjacent bits which causes noise and lowers the resolution of reproduction. As a result, reproduction is performed by involving only an area smaller than a spot diameter of the laser light in reproduction. It is thus possible to reproduce a smaller recording bit and improve the recording density.

As described above, in the magneto-optical disks of the Embodiments 3 and 4, the second magnetic layer 14 is formed between the first magnetic layer 3 as the memory layer and the third magnetic layer 5 as the writing layer. The second magnetic layer 14 exhibits in-plane magnetization at room temperature, a transition from in-plane magnetization to perpendicular magnetization with an increase of the temperature, and in-plane magnetization when the temperature is further increased. Therefore, rewriting of information by overwriting, i.e., overwriting with light-intensity modulation is feasible by irradiating laser light whose intensity is modulated between high level I and low level II while applying the recording magnetic field $H_W$ after the initialization.

Moreover, since the second magnetic layer 14 also exhibits in-plane magnetization at room temperature and a temperature at which the magnetization direction of the third magnetic layer 5 oriented by the initialization is reversed by irradiating the laser light of high level I, it is possible to reduce the initializing magnetic field Hinit as well as the power of the recording-use laser light or the recording magnetic field $H_W$. It is therefore possible to stably perform overwriting with light-intensity modulation.

In addition, in Embodiments 3 and 4, since the third magnetic layer 5 has a compensation temperature $Tcomp_3$ between room temperature and the Curie point $Tc_3$, it is possible to align the initializing magnetic field Hinit and the recording magnetic field $H_W$ in the same direction. It is thus possible to closely dispose both the generating sections for generating the respective magnetic fields in the device or determine the initializing magnetic field Hinit and the recording magnetic field $H_W$ depending on a combination of the magnetic fields produced by the generating sections. As a result, the size and power consumption of the device are reduced.

The above-mentioned embodiments do not intend to limit the present invention, and therefore the invention may be varied in many ways within the scope of the invention. For example, the materials and compositions of the first to fourth magnetic layers 3 to 5, 8 and 14 may be different from those mentioned above. For instance, the same effects are produced by forming the first to third magnetic layers 3 to 5 and 14 from alloys of at least one type of rare-earth metal selected from the group consisting of Gd, Tb, Dy, Ho and Nd and at least one type of transition metal selected from the group consisting of Fe and Co.

However, as described in the above-mentioned embodiment, GdFeCo is a suitable material for the second magnetic layer 14 which shows in-plane magnetization at room temperature, temporarily shows perpendicular magnetization with an increase of the temperature, and again shows in-plane magnetization. FIGS. 13(a) and 13(b) show the relation between the materials, for example, GdTbFe, and the state of magnetization. As illustrated in FIG. 13(a), the curve showing the compensation temperature $Tcomp_2$ of GdFeCo moderately curves with respect to variations compared with that of GdTbFe shown in FIG. 13(b).

Therefore, a range including the compensation temperature $Tcomp_2$ within which perpendicular magnetization is exhibited moderately changes with respect to the variations in the composition. Thus, as indicated by the broken lines of FIG. 13(a), when a composition X is determined and when the actual composition of the second magnetic layer 14 which is to be produced according to the composition X varies, the tolerance becomes wider. Consequently, the second magnetic layer 14 having the above-mentioned magnetic properties is easily produced, thereby improving the stability in performing recording under the above-mentioned recording conditions.

Moreover, when at least one element selected from the group consisting of Cr, V, Nb, Mn, Be, Ni, Ti, Pt, Rh, and Cu is added to the above-mentioned materials, the environmental resistance of each of the first to third magnetic layers 3 to 5 and 14 is improved. Namely, the deterioration of the characteristics of the first and third magnetic layers 3 and 5 due to oxidization caused by the immersion of moisture and oxygen is reduced. Thus, the resulting magneto-optical disk is highly reliable for a long time.

When the Curie point $Tc_1$ of the first magnetic layer 3 is lower than 100° C., the C/N becomes lower than 45 dB which is the minimum level required for digital recording and reproduction. On the other hand, when the Curie point $Tc_1$ exceeds 250° C., the recording sensitivity is lowered. It is thus preferable to set the Curie point $Tc_1$ between 100° and 250° C. In addition, when the coercive force $Hc_1$ of the first magnetic layer 3 at room temperature is lower than 400 kA/m, a part of the first magnetic layer 3 may be initialized by the initializing magnetic field Hinit. It is therefore suitable to set the coercive force $Hc_1$ of the first magnetic layer 3 at room temperature not to be lower than 400 kA/m.

When the second magnetic layers 4 and 14 show perpendicular magnetization at temperatures lower than 80° C., the magnetization may be copied from the third magnetic layer 5 to the second magnetic layers 4 and 14, and the magnetization may be copied from the second magnetic layers 4 and 14 to the first magnetic layer 3 at temperatures between room temperature and a temperature raised by the irradiation of laser light with reproduction-use laser power $R_R$ of level III. In this case, not only the third magnetic layer 5 but also the first magnetic layer 3 are initialized by the initializing magnetic field Hinit. Therefore, the information recorded on the first magnetic layer 3 is not retained. It is thus suitable to arrange the second magnetic layers 4 and 14 to show perpendicular magnetization at temperatures not lower than 80° C.

When the Curie point $Tc_3$ of the third magnetic layer 5 is lower than 150° C., the difference between the laser power $P_L$ of low level II and the reproduction-use laser power $P_R$ becomes smaller. Consequently, satisfactory overwriting is not performed by light-intensity modulation. On the other hand, when the Curie point $Tc_3$ exceeds 400° C., the recording sensitivity is lowered. It is thus suitable to set the Curie point $Tc_3$ of the third magnetic layer 5 between 150° and 400° C.

When the coercive force $Hc_3$ of the third magnetic layer 5 at room temperature exceeds 240 kA/m, the generating device for generating the initializing magnetic field Hinit becomes unwillingly larger. It is therefore suitable to set the coercive force $Hc_3$ of the third magnetic layer 5 at room temperature not to be larger than 240 kA/m.

The film thicknesses of the first to third magnetic layers 3 to 5 and 14 are determined depending on the materials and compositions thereof. The film thickness of the first magnetic layer 3 is preferably arranged not to be smaller than 20 nm, more preferably not to be smaller than 30 nm. If the film thickness is too large, the information on the third magnetic layer 5 is not transferred. It is therefore preferable to arrange the film thickness of the first magnetic layer 3 not to be larger than 100 nm. The film thickness of each of the second magnetic layers 4 and 14 is preferably set not to be smaller than 5 nm, more preferably between 10 and 50 nm. If the film thickness is too large, the information on the third magnetic layer 5 is not transferred. It is therefore preferable to set the film thickness of each of the second magnetic layers 4 and 14 not to be larger than 100 nm. The film thickness of the third magnetic layer 5 is preferably set not to be smaller than 20 nm, more preferably between 30 nm and 100 nm. If the film thickness is too large, the recording sensitivity is lowered. It is therefore preferable to set the film thickness of the third magnetic layer 5 not to be larger than 200 nm In the above-mentioned embodiments, normal glass is used as the substrate 1. Alternatively, it is possible to use chemically reinforced glass, a so-called 2P-layered glass substrate which is produced by forming an ultraviolet rays-hardening resin film on the glass substrate, or the substrate formed by polycarbonate (PC), polymethyl methacrylate (PMMA), amorphous polyolefin (APO), polystyrene (PS), polybiphenyl chloride (PVC), epoxy, etc.

The film thickness of AlN as the transparent dielectric layer 2 is not restricted to 80 nm described in the above-mentioned embodiments. The film thickness of the transparent dielectric layer 2 is determined considering a so-called Kerr effect enhancement which increases the polar Kerr rotation angle by using the interference effect of light from the first magnetic layer 3 or the fourth magnetic layer 8 when reproducing information from the magneto-optical disk. In order to increase the C/N as much as possible during reproduction, it is necessary to increase the polar Kerr rotation angle. Therefore, the film thickness of the transparent dielectric layer 2 is set so as to achieve the maximum polar Kerr rotation angle.

The polar Kerr rotation angle varies depending on the wavelength of reproduction-use light and the refractive index of the transparent dielectric layer 2. In the above-mentioned embodiments, since the refractive index of AlN is 2.0, when the wavelength of reproduction-use light is 780 nm, the effect of enhancing the Kerr effect is increased by setting the film thickness of AlN of the transparent dielectric layer 2 between 30 and 120 nm. The film thickness of AlN of the transparent dielectric layer 2 is more preferably set between 70 and 100 nm. When the film thickness is within this range, the polar Kerr rotation angle becomes substantially maximum.

When the wavelength of reproduction-use light is 400 nm, the film thickness of the transparent dielectric layer 2 needs to be reduced to a half (=400/780). Moreover, when the refractive index of the transparent dielectric layer 2 differs from the above-mentioned value due to differences in the materials and the methods used for forming the transparent dielectric layer 2, it is necessary to set the film thickness of the transparent dielectric layer 2 so that a value (the length of light path) obtained by multiplying the refractive index by the film thickness becomes uniform.

By increasing the refractive index of the transparent dielectric layer 2, the film thickness thereof can be reduced. Additionally, the effect of enhancing the polar Kerr rotation angle is increased as the refractive index of transparent dielectric layer 2 becomes larger.

The refractive index of AlN is varied by changing the ratio of Ar and $N_2$ of a sputtering gas and the gas pressure. However, AlN is a material having a relatively large refractive index of about 1.8 to 2.1. It is therefore suitable to use AlN as a material for the transparent dielectric layer 2.

Furthermore, the transparent dielectric layer 2 not only enhances the Kerr effect, but also prevents the oxidation of the first to fourth magnetic layers 3 to 5, 8 and 14 formed by alloys of rare-earth and transition metal.

The magnetic films formed by alloys of rare-earth metal and transition metal are easily oxidized, in particular, rare-earth metal is very easily oxidized. Therefore, if the immersion of oxygen and moisture from outside is not effectively prevented, the properties of the magnetic films considerably deteriorate.

In order to prevent deterioration, the first to third magnetic layers 3 to 5 and 14 or the first to fourth magnetic layers 3 to 5, 8 and 14 are sandwiched between two films of AlN. AlN is a nitride film containing no oxygen and has a very high moisture resistance. Additionally, since AlN permits reactive DC (direct current) sputtering by using an Al target and introducing $N_2$ gas or a mixed gas of Ar and $N_2$. The reactive DC sputtering is advantageous because it achieves an increased film forming speed compared with RF (high frequency) sputtering.

In addition to AlN, suitable materials for the transparent dielectric layer 2 are SiN, AlSiN, AlTaN, SiAlON, TiN, TiON, BN, ZnS, $TiO_2$, $BaTiO_3$, $SrTiO_3$ and so on. Among these materials, SiN, AlSiN, AlTaN, TiN, BN and ZnS which contain no oxygen are particularly suitable, and provide a magneto-optical disk with a high moisture resistance.

Although the film thickness of AlN of the protective layer 6 was 80 nm in the above-mentioned embodiments, it is not restricted to this value. A suitable film thickness of the protective layer 6 is within a range between 1 and 200 nm.

In the above-mentioned embodiments, the total film thickness of the first to third magnetic layers 3 to 5 and 14 or the first to fourth magnetic layers 3 to 5, 8 and 14 is not smaller 100 nm. With this film thickness, incident light from an optical pickup can hardly pass through the magnetic layers. Thus, if the oxidation of the magnetic layers is prevented for a long time, the film thickness of the protective layer 6 is not particularly limited. The film thickness needs to be increased when the material has a lower oxidation preventing property, while it needs to be decreased when the material has a higher oxidation preventing property.

The thermal conductivity of the protective layer 6 as well as of the transparent dielectric layer 2 influences the characteristics of the recording sensitivity of the magneto-optical disk. The characteristics of the recording sensitivity indicate a level of laser power necessary for recording or erasing information. Most parts of incident light on the magneto-optical disk pass through the transparent dielectric layer 2, are absorbed by the first to third magnetic layers 3 to 5 and 14 or the first to fourth magnetic layers 3 to 5, 8 and 14 as absorbing films and changed to heat. At this time, the heat of the first to third magnetic layers 3 to 5 and 14 or the first to fourth magnetic layers 3 to 5, 8 and 14 is moved to the dielectric transparent layer 2 and the protective layer 6 by the thermal conductivity thereof. Accordingly, the recording sensitivity is affected by the thermal conductivity and thermal capacity (specific heat) of the transparent dielectric layer 2 and the protective layer 6.

In other words, the recording sensitivity of the magneto-optical disk is controllable to a degree by the film thickness of the protective layer 6. For example, in order to increase the recording sensitivity (in order to perform recording and erasing with low laser power), the film thickness of the protective layer 6 is decreased. In general, in order to increase the life of the laser, a higher recording sensitivity and a smaller film thickness of the protective layer 6 are advantageous.

Thus, AlN is also suitable in this sense. Since AlN has high resistance to moisture, if it is used as the protective layer 6, a reduced film thickness is achieved and a magneto-optical disk with high recording sensitivity is provided.

In the above-mentioned embodiments, a magneto-optical disk with high moisture resistance is provided by forming both the protective layer 6 and the transparent dielectric layer 2 using AlN. Moreover, the productivity is improved by forming both the protective layer 6 and the transparent dielectric layer 2 by the same material.

Considering the above-mentioned objectives and effects, suitable materials for forming the protective layer 6 are SiN, AlSiN, AlTaN, SiAlON, TiN, TiON, BN, ZnS, $TiO_2$, $BaTiO_3$, and $SrTiO_3$ as well as AlN. Among these materials, SiN, AlSiN, AlTaN, TiN, BN, and ZnS containing no oxygen are particularly suitable to produce a magneto-optical disk with high moisture resistance.

The magneto-optical disks disclosed in the above-mentioned embodiments are of a so-called single-sided type. If the thin films of the transparent dielectric layer 2, the first to third magnetic layers 3 to 5 and 14 (or the first to fourth magnetic layers 3 to 5, 8 and 14) and the protective layer 6 are referred to as a recording medium layer, a single-sided magneto optical disk is composed of the substrate 1, the recording medium layer and the overcoat layer 7. Whereas, in a so-called both-sided magneto-optical disk, two substrates 1 whereupon the recording medium layers are laminated, respectively, by an adhesive layer so that the respective recording medium layers face each other.

As for the material for the adhesive layer, a polyurethane acrylate series adhesive agent is particularly preferable. The above adhesive agent has a combination of ultraviolet rays, heat and anaerobic hardening properties. Thus, an area shaded by the recording medium layer which does not transmit ultraviolet rays is hardened by the function of heat and the anaerobic function. It is therefore possible to provide a double-sided magneto-optical disk which has extremely high moisture resistance and ensures a reliable performance for a long time.

In the single-sided magneto-optical disk, the thickness of an element is a half of that of the double-sided magneto-optical disk. It is therefore suitable to use the single-sided magneto-optical disk with, for example, a compact magneto-optical recording and reproducing device. By contrast, the double-sided magneto-optical disk is suitable for use in, for example, a large capacity recording and reproducing device because information is reproducible from both sides of the disk.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:

a memory layer showing perpendicular magnetization within a first temperature range between room temperature and a Curie point thereof;

a writing layer showing perpendicular magnetization within a second temperature range between room temperature and a Curie point thereof which is higher than the Curie point of said memory layer, said writing layer having a coercive force smaller than a coercive force of said memory layer at room temperature; and an intermediate layer between said memory layer and said writing layer, said intermediate layer showing in-plane magnetization at room temperature and perpendicular magnetization within a third temperature range within which the coercive force of said memory layer is smaller than the coercive force of said writing layer, said intermediate layer having a Curie point lower than the Curie point of said memory layer.

2. The magneto-optical recording medium according to claim 1, further comprising a readout layer on a side of said memory layer on which said intermediate layer is not formed, wherein said readout layer has a Curie point higher than the Curie point of said memory layer, and shows in-plane magnetization at room temperature and perpendicular magnetization within a temperature range between a temperature higher than room temperature and a temperature lower than the Curie point of said memory layer.

3. A magneto-optical recording medium comprising:

a memory layer showing perpendicular magnetization within a first temperature range between room temperature and a Curie point thereof;

a writing layer showing perpendicular magnetization within a second temperature range between room temperature and a Curie point thereof which is higher than the Curie point of said memory layer, said writing layer having a coercive force smaller than a coercive force of said memory layer at room temperature; and an intermediate layer between said memory layer and said writing layer, said intermediate layer showing perpendicular magnetization within a third temperature range within which the coercive force of said memory layer is smaller than the coercive force of said writing layer and in-plane magnetization at temperatures lower than and higher than said third temperature range.

4. The magneto-optical recording medium according to claim 3, wherein said intermediate layer is formed by a film of a GdFeCo series rare-earth and transition metal alloy.

5. The magneto-optical recording medium according to claim 3, further comprising a readout layer on a side of said memory layer on which said intermediate layer is not formed, wherein said readout layer has a Curie point higher than the Curie point of said memory layer, and shows in-plane magnetization at room temperature and perpendicular magnetization within a temperature range between a temperature higher than room temperature and a temperature lower than the Curie point of said memory layer.

* * * * *